(12) United States Patent
Goetzl et al.

(10) Patent No.: US 10,154,651 B2
(45) Date of Patent: Dec. 18, 2018

(54) INTEGRATED DOG TRACKING AND STIMULUS DELIVERY SYSTEM

(71) Applicant: Radio Systems Corporation, Knoxville, TN (US)

(72) Inventors: Brent Goetzl, Orinda, CA (US); Harri Piltonen, Varjakka (FI); Jason Edwards, Knoxville, TN (US); Kevin Zinn, Knoxville, TN (US); Kenneth Wacasey, Knoxville, TN (US)

(73) Assignee: RADIO SYSTEMS CORPORATION, Knoxville, TN (US)

( * ) Notice: Subject to any disclaimer, the term of this patent is extended or adjusted under 35 U.S.C. 154(b) by 0 days.

(21) Appl. No.: 14/340,493

(22) Filed: Jul. 24, 2014

(65) Prior Publication Data

US 2015/0040839 A1 Feb. 12, 2015

Related U.S. Application Data

(63) Continuation-in-part of application No. 13/311,129, filed on Dec. 5, 2011, now Pat. No. 8,803,692.

(60) Provisional application No. 61/926,797, filed on Jan. 13, 2014.

(51) Int. Cl.
*A01K 15/02* (2006.01)
*A01K 27/00* (2006.01)

(52) U.S. Cl.
CPC .......... *A01K 15/022* (2013.01); *A01K 15/021* (2013.01); *A01K 15/023* (2013.01); *A01K 27/009* (2013.01)

(58) Field of Classification Search
CPC ...... A01K 15/00; A01K 15/02; A01K 15/021; A01K 15/022; H03K 3/537
See application file for complete search history.

(56) References Cited

U.S. PATENT DOCUMENTS

| | | |
|---|---|---|
| 2,741,224 A | 4/1956 | Puman |
| 3,184,730 A | 5/1965 | Irish |
| 3,500,373 A | 3/1970 | Arthur |
| 3,735,757 A | 5/1973 | MacFarland |
| 4,426,884 A | 1/1984 | Polchaninoff |
| 4,783,646 A | 11/1988 | Matsuzaki |
| 4,794,402 A | 12/1988 | Gonda et al. |
| 4,802,482 A | 2/1989 | Gonda et al. |
| 4,947,795 A | 8/1990 | Farkas |

(Continued)

OTHER PUBLICATIONS

High Tech Products, Inc. Human Contain Model X-10 Rechargeable, Multi-Function Electronic Dog fence Ultra-System, Apr. 28, 2012.

(Continued)

*Primary Examiner* — Michael H Wang
(74) *Attorney, Agent, or Firm* — Baker, Donelson, Bearman, Caldwell & Berkowitz PC

(57) ABSTRACT

A system and apparatus to track and control an animal is described, including a tracking unit to track the animal, and a stimulus unit to provide a stimulus to the animal, wherein the tracking unit and stimulus unit are configured to be coupled together. The stimulus unit is entirely a slave device to the tracking unit and has no independent smart circuitry, no independent power supply and no antennae. Accordingly, the stimulation unit is dependent upon the tracking unit for operation, power and for communication to and from a remote hand held control device.

18 Claims, 21 Drawing Sheets

(56) References Cited

U.S. PATENT DOCUMENTS

| | | | |
|---|---|---|---|
| 4,969,418 A | 11/1990 | Jones | |
| 5,054,428 A | 10/1991 | Farkus | |
| 5,159,580 A | 10/1992 | Andersen et al. | |
| 5,161,485 A * | 11/1992 | McDade | A01K 15/021 119/720 |
| 5,182,032 A | 1/1993 | Dickie et al. | |
| 5,207,178 A * | 5/1993 | McDade | A01K 27/009 119/765 |
| 5,207,179 A | 5/1993 | Arthur et al. | |
| 5,526,006 A | 6/1996 | Akahane et al. | |
| 5,559,498 A | 9/1996 | Westrick et al. | |
| 5,576,972 A | 11/1996 | Harrison | |
| 5,586,521 A | 12/1996 | Kelley | |
| 5,601,054 A * | 2/1997 | So | A01K 15/022 119/718 |
| 5,642,690 A | 7/1997 | Calabrese et al. | |
| 5,815,077 A * | 9/1998 | Christiansen | A01K 15/021 119/712 |
| 5,844,489 A | 12/1998 | Yarnall, Jr. et al. | |
| 5,857,433 A | 1/1999 | Files | |
| 5,872,516 A | 2/1999 | Bonge, Jr. | |
| 5,886,669 A | 3/1999 | Kita | |
| 5,923,254 A | 7/1999 | Brune | |
| 5,927,233 A | 7/1999 | Mainini et al. | |
| 5,933,079 A | 8/1999 | Frink | |
| 5,934,225 A | 8/1999 | Williams | |
| 5,949,350 A | 9/1999 | Girard et al. | |
| 5,957,983 A | 9/1999 | Tominaga | |
| 5,982,291 A | 11/1999 | Williams et al. | |
| 6,019,066 A * | 2/2000 | Taylor | G11B 31/003 119/719 |
| 6,028,531 A | 2/2000 | Wanderlich | |
| 6,047,664 A | 4/2000 | Lyerly | |
| 6,075,443 A | 6/2000 | Schepps et al. | |
| 6,166,643 A | 12/2000 | Janning et al. | |
| 6,170,439 B1 | 1/2001 | Duncan et al. | |
| 6,184,790 B1 | 2/2001 | Gerig | |
| 6,196,990 B1 | 3/2001 | Zicherman | |
| 6,215,314 B1 | 4/2001 | Frandewich, Jr. | |
| 6,232,880 B1 * | 5/2001 | Anderson | A01K 15/023 119/421 |
| 6,271,757 B1 | 8/2001 | Touchton et al. | |
| 6,327,999 B1 | 12/2001 | Gerig | |
| 6,360,697 B1 | 3/2002 | Williams | |
| 6,360,698 B1 | 3/2002 | Stapelfeld et al. | |
| 6,415,742 B1 | 7/2002 | Lee et al. | |
| 6,426,464 B1 | 7/2002 | Spellman et al. | |
| 6,431,122 B1 | 8/2002 | Westrick et al. | |
| 6,459,378 B2 | 10/2002 | Gerig | |
| 6,487,992 B1 * | 12/2002 | Hollis | A01K 15/021 119/712 |
| 6,561,137 B2 * | 5/2003 | Oakman | A01K 15/023 119/721 |
| 6,581,546 B1 | 6/2003 | Dalland et al. | |
| 6,588,376 B1 | 7/2003 | Groh | |
| 6,598,563 B2 | 7/2003 | Kim et al. | |
| 6,600,422 B2 | 7/2003 | Barry et al. | |
| 6,637,376 B2 | 10/2003 | Lee, IV | |
| 6,657,544 B2 | 12/2003 | Barry et al. | |
| 6,668,760 B2 | 12/2003 | Groh et al. | |
| 6,799,537 B1 | 10/2004 | Liao | |
| 6,807,720 B2 | 10/2004 | Brune et al. | |
| 6,825,768 B2 | 11/2004 | Stapelfeld et al. | |
| 6,874,447 B1 | 4/2005 | Kobett | |
| 6,888,502 B2 | 5/2005 | Beigel et al. | |
| 6,901,883 B2 | 6/2005 | Gillis et al. | |
| 6,907,844 B1 | 6/2005 | Crist et al. | |
| 6,907,883 B2 | 6/2005 | Lin | |
| 6,923,146 B2 * | 8/2005 | Kobitz | A01K 15/023 119/721 |
| 6,928,958 B2 | 8/2005 | Crist | |
| 6,956,483 B2 | 10/2005 | Schmitt et al. | |
| 6,970,090 B1 | 11/2005 | Sciarra | |
| 7,198,009 B2 | 4/2007 | Crist et al. | |
| 7,222,589 B2 * | 5/2007 | Lee, IV | A01K 15/022 119/718 |
| 7,249,572 B2 | 7/2007 | Goetzl | |
| 7,267,081 B2 * | 9/2007 | Steinbacher | A01K 27/009 119/858 |
| 7,296,540 B2 | 11/2007 | Boyd | |
| 7,328,671 B2 | 2/2008 | Kates | |
| 7,382,328 B2 | 6/2008 | Lee et al. | |
| 7,411,492 B2 * | 8/2008 | Greenberg | A01K 15/023 340/539.13 |
| 7,434,541 B2 | 10/2008 | Kates | |
| 7,518,275 B2 | 4/2009 | Suzuki et al. | |
| 7,562,640 B2 | 7/2009 | Lalor | |
| 7,602,302 B2 | 10/2009 | Hokuf et al. | |
| 7,667,607 B2 * | 2/2010 | Gerig | A01K 15/021 340/573.1 |
| 7,705,736 B1 | 4/2010 | Kedziora | |
| 7,814,865 B2 | 10/2010 | Tracy et al. | |
| 7,864,057 B2 * | 1/2011 | Milnes | A01K 15/023 119/721 |
| 7,900,585 B2 | 3/2011 | Lee, IV et al. | |
| 7,996,983 B2 | 8/2011 | Lee, IV et al. | |
| 8,011,327 B2 | 9/2011 | Mainini et al. | |
| 8,047,161 B2 | 11/2011 | Moore | |
| 8,069,823 B2 | 12/2011 | Mainini et al. | |
| 8,098,164 B2 | 1/2012 | Gerig et al. | |
| 8,159,355 B2 | 4/2012 | Gerig et al. | |
| 8,342,134 B2 | 1/2013 | Lee, IV et al. | |
| 8,342,135 B2 | 1/2013 | Peinetti et al. | |
| 8,436,735 B2 | 5/2013 | Mainini | |
| 8,456,296 B2 | 6/2013 | Piltonen et al. | |
| 8,714,113 B2 | 5/2014 | Lee, IV et al. | |
| 8,736,499 B2 | 5/2014 | Goetzl et al. | |
| 8,803,692 B2 | 8/2014 | Goetzl et al. | |
| 8,807,089 B2 | 8/2014 | Brown et al. | |
| 8,823,513 B2 | 9/2014 | Jameson et al. | |
| 2002/0010390 A1 | 1/2002 | Guice et al. | |
| 2002/0015094 A1 | 2/2002 | Kuwano et al. | |
| 2002/0036569 A1 | 3/2002 | Martin | |
| 2002/0092481 A1 | 7/2002 | Spooner | |
| 2002/0196151 A1 | 12/2002 | Troxler | |
| 2003/0035051 A1 | 2/2003 | Cho et al. | |
| 2003/0116099 A1 | 6/2003 | Kim et al. | |
| 2003/0169207 A1 | 9/2003 | Beigel | |
| 2003/0179140 A1 | 9/2003 | Patterson et al. | |
| 2003/0218539 A1 | 11/2003 | Hight | |
| 2004/0108939 A1 | 6/2004 | Giunta | |
| 2004/0162875 A1 * | 8/2004 | Brown | G08B 5/223 709/203 |
| 2005/0000469 A1 * | 1/2005 | Giunta | A01K 15/023 119/721 |
| 2005/0007251 A1 | 1/2005 | Crabtree | |
| 2005/0020279 A1 | 1/2005 | Markhovsky et al. | |
| 2005/0035865 A1 | 2/2005 | Brennan et al. | |
| 2005/0059079 A1 | 3/2005 | Burgess | |
| 2005/0066912 A1 | 3/2005 | Korbitz et al. | |
| 2005/0081797 A1 | 4/2005 | Laitinen et al. | |
| 2005/0145196 A1 | 7/2005 | Crist et al. | |
| 2005/0145200 A1 | 7/2005 | Napolez et al. | |
| 2005/0172912 A1 | 8/2005 | Crist et al. | |
| 2005/0217606 A1 | 10/2005 | Lee et al. | |
| 2005/0235924 A1 | 10/2005 | Lee et al. | |
| 2005/0263106 A1 | 12/2005 | Steinbacher | |
| 2005/0280546 A1 | 12/2005 | Ganley et al. | |
| 2005/0288007 A1 | 12/2005 | Benco et al. | |
| 2006/0000015 A1 | 1/2006 | Duncan | |
| 2006/0011145 A1 | 1/2006 | Kates | |
| 2006/0027185 A1 * | 2/2006 | Troxler | A01K 15/023 119/721 |
| 2006/0092676 A1 | 5/2006 | Liptak et al. | |
| 2006/0102101 A1 * | 5/2006 | Kim | A01K 15/023 119/720 |
| 2006/0112901 A1 | 6/2006 | Gomez | |
| 2006/0191491 A1 * | 8/2006 | Nottingham | A01K 27/005 119/721 |
| 2006/0196445 A1 | 9/2006 | Kates | |
| 2007/0011339 A1 | 1/2007 | Brown | |
| 2007/0103296 A1 | 5/2007 | Paessel et al. | |

(56) References Cited

U.S. PATENT DOCUMENTS

| | | |
|---|---|---|
| 2007/0204803 A1 | 9/2007 | Ramsay |
| 2007/0204804 A1* | 9/2007 | Swanson .............. A01K 15/023 119/721 |
| 2007/0249470 A1 | 10/2007 | Niva et al. |
| 2007/0266959 A1 | 11/2007 | Brooks |
| 2008/0004539 A1 | 1/2008 | Ross |
| 2008/0036610 A1 | 2/2008 | Hokuf et al. |
| 2008/0055154 A1 | 3/2008 | Martucci et al. |
| 2008/0055155 A1 | 3/2008 | Hensley et al. |
| 2008/0058670 A1 | 3/2008 | Mainini |
| 2008/0061978 A1 | 3/2008 | Huang |
| 2008/0061990 A1 | 3/2008 | Milnes et al. |
| 2008/0119757 A1 | 5/2008 | Berry et al. |
| 2008/0129457 A1 | 6/2008 | Ritter et al. |
| 2008/0141949 A1 | 6/2008 | Taylor |
| 2008/0143516 A1 | 6/2008 | Mock et al. |
| 2008/0156277 A1 | 7/2008 | Mainini et al. |
| 2008/0163827 A1* | 7/2008 | Goetzl .............. A01K 27/006 119/712 |
| 2008/0186167 A1 | 8/2008 | Ramachandra |
| 2008/0186197 A1 | 8/2008 | Rochelle et al. |
| 2008/0236514 A1 | 10/2008 | Johnson et al. |
| 2008/0252527 A1 | 10/2008 | Garcia |
| 2008/0272908 A1 | 11/2008 | Boyd |
| 2009/0000566 A1 | 1/2009 | Kim |
| 2009/0002188 A1 | 1/2009 | Greenberg |
| 2009/0012355 A1 | 1/2009 | Lin |
| 2009/0020002 A1 | 1/2009 | Williams et al. |
| 2009/0025651 A1 | 1/2009 | Lalor |
| 2009/0031966 A1 | 2/2009 | Kates |
| 2009/0082830 A1 | 3/2009 | Folkerts et al. |
| 2009/0102668 A1 | 4/2009 | Thompson et al. |
| 2009/0224909 A1 | 9/2009 | Derrick et al. |
| 2009/0289785 A1 | 11/2009 | Leonard |
| 2009/0289844 A1 | 11/2009 | Palsgrove et al. |
| 2010/0033339 A1 | 2/2010 | Gurley et al. |
| 2010/0107985 A1 | 5/2010 | O'Hare |
| 2010/0139576 A1 | 6/2010 | Kim et al. |
| 2010/0154721 A1 | 6/2010 | Gerig |
| 2010/0231391 A1* | 9/2010 | Dror .............. G01D 1/00 340/573.3 |
| 2010/0238022 A1 | 9/2010 | Au et al. |
| 2010/0315241 A1* | 12/2010 | Jow .............. A01K 11/008 340/573.3 |
| 2012/0000431 A1 | 1/2012 | Khoshkish |
| 2012/0006282 A1 | 1/2012 | Kates |
| 2012/0037088 A1* | 2/2012 | Altenhofen .......... A01K 11/008 119/720 |
| 2012/0132151 A1 | 5/2012 | Touchton et al. |
| 2012/0312250 A1 | 12/2012 | Jesurum |
| 2013/0099920 A1 | 4/2013 | Song et al. |
| 2013/0141237 A1* | 6/2013 | Goetzl .............. A01K 15/021 340/539.13 |
| 2013/0321159 A1 | 12/2013 | Schofield et al. |
| 2014/0020635 A1 | 1/2014 | Sayers et al. |
| 2014/0053788 A1 | 2/2014 | Riddell |
| 2014/0132608 A1 | 5/2014 | Mund et al. |
| 2014/0174376 A1 | 6/2014 | Touchton et al. |
| 2015/0107531 A1 | 4/2015 | Golden |

OTHER PUBLICATIONS

Form PCT/ISA/210, International Search Report, dated Apr. 13, 2015.
Form PCT/ISA/237, Written Opinion of the International Searching Authority, dated Apr. 13, 2015.
Extended European Search Report for European Application No. 11784149.4 dated Nov. 17, 2017, 7 pages.
Extended European Search Report for European Application No. 15735439.0 dated Oct. 18, 2017, 9 pages.
Extended European Search Report for European Application No. 17162289.7 dated Aug. 31, 2017, 7 pages.
International Preliminary Report for Patentability Chapter II for International Application No. PCT/US2014/024875 dated Mar. 12, 2015, 17 pages.
International Preliminary Report on Patentability for Application No. PCT/US2015/043653 dated Dec. 19, 2017, 14 pages.
International Search Report and Written Opinion for International Application No. PCT/US2014/024875 dated Jun. 27, 2014, 12 pages.
International Search Report for International Application No. PCT/US2014/020344 dated Jun. 5, 2014, 2 pages.
International Search Report for International Application No. PCT/US20141066650 dated Feb. 19, 2015, 3 pages (Outgoing).
International Search Report for International Application No. PCT/US2015/043653, Form PCT/ISA/210 dated Oct. 23, 2015, 2 pages.
Notification of Transmittal of the International Search Report and the Written Opinion of the International Searching Authority for International Application No. PCT/US2015/043653, Form PCT/ISA/220 dated Oct. 23, 2015, 1 page.
Notification of Transmittal of the International Search Report and Written Opinion for the International Application No. PCT/US2014/066650 dated Feb. 19, 2015, 1 page.
Welch et al., "An Introduction to the Kalman Filter," Department of Computer Science, Jul. 24, 2006, pp. 1-16.
Written Opinion for International Application No. PCT/US2014/066650 dated Feb. 19, 2015, 15 pages(outgoing).
Written Opinion for International Application No. PCT/US20151043653, Form PCT/ISA/237 dated Oct. 23, 2015, 13 pages.

* cited by examiner

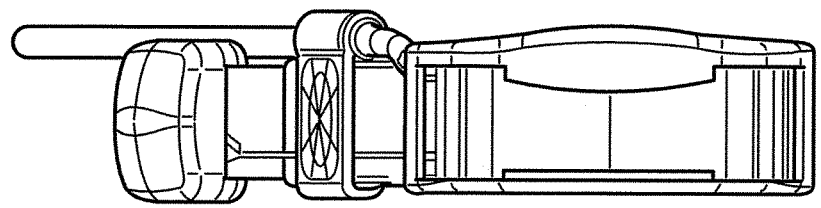
FIG. 27
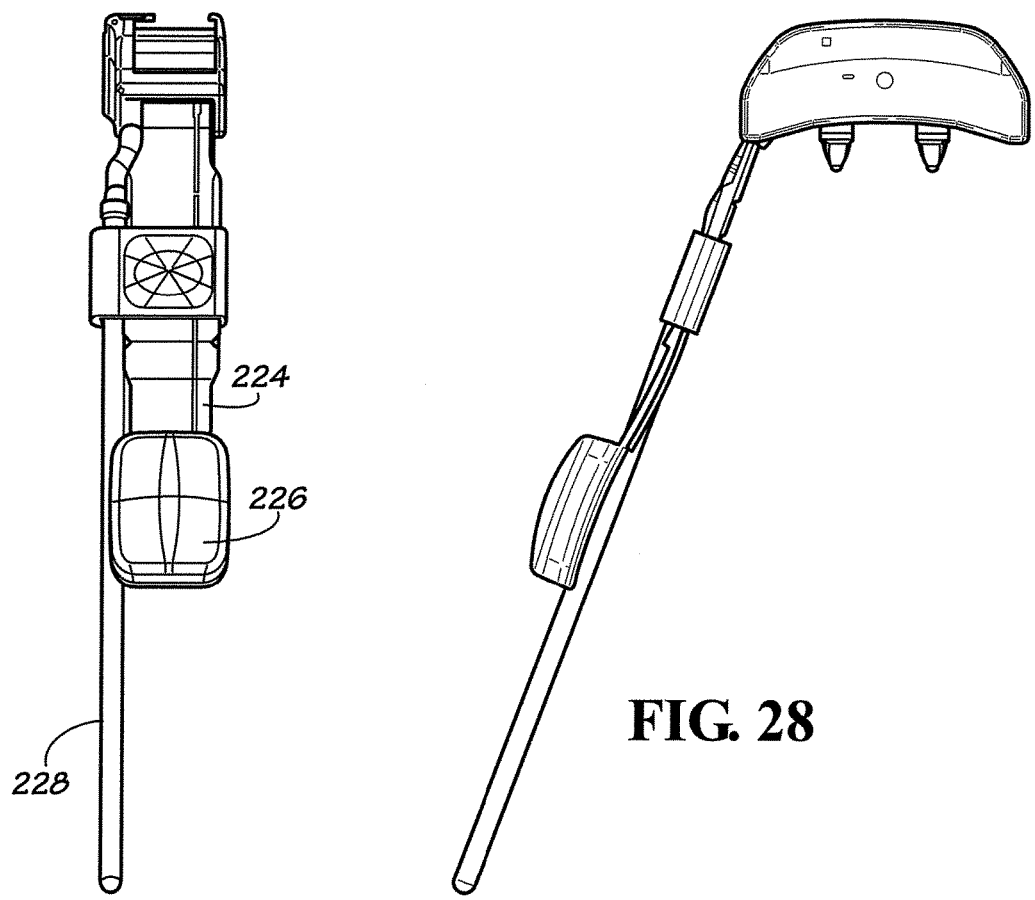
FIG. 28
FIG. 26

# INTEGRATED DOG TRACKING AND STIMULUS DELIVERY SYSTEM

CROSS REFERENCE TO RELATED APPLICATIONS

This application claims the benefit of U.S. Patent Application No. 61/926,797, dated Jan. 13, 2014.

This application is filed as a continuation-in-part of U.S. patent application Ser. No. 13/311,129, filed on Dec. 5, 2011.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

BACKGROUND OF THE INVENTION

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

FIELD OF THE INVENTION

The present inventive concept relates to the field of animal tracking devices. More particularly, the invention relates to a modular dog collar having a docking system for selectively and operatively connecting a stimulus unit to a tracking unit.

TECHNOLOGY IN THE FIELD OF THE INVENTION

In order to train and/or control an animal, numerous collar mounted stimulation devices have been developed and marketed throughout the pet industry. The majority of such conventional devices have typically been grouped together under the general category of dog training systems. The conventional stimulation devices deliver stimulation to the animal in the form of shock, sound, vibration or spray to correct any of a variety of behaviors. Such stimulation devices are typically controlled by auto-activation based on feedback picked up from the animal by sensors in the collar mounted device, by manual control provided by a wireless link between the collar mounted device and a remote handheld unit, or a combination of both.

In addition to the need to train or control an animal's behavior, there is also a need to track an animal's location and movement in real time. Dog location systems are currently available on the market. Such dog location systems can typically be divided into three technologies: telemetry-based, GNSS (Global Network Satellite Systems)/telemetry-based, and GNSS/cell phone-based.

Regardless of the stimulation system used, or the tracking technology used, it is common for a user to want to use an animal training system in conjunction with an animal tracking system for the same animal. Of course, a user may employ two separate systems for the same animal, wherein one system provides the animal training, i.e., the stimulus, and the other system provides the animal tracking. Each of these systems operates independently and requires its own control device, such as two separate dedicated wireless remote handheld control units. This implementation is cumbersome as it would two remote handheld control units and, most likely, two separate dog collar attachments.

In many dog competitions, it is not permissible to outfit the competing dog with any type of stimulus unit during a performance. This renders the dual system illegal for competition. This would also render any system that attempts to integrate the circuitry or control for the tracking system and the training system into a single unit illegal.

Therefore, a need exists for an integrated dog tracking and training system which provides for the selective coupling and decoupling of the stimulation components and the overall system A need further exists for a combined tracking system and stimulation system wherein the stimulation (or training) system share circuitry, power and control, but wherein the stimulation system is a modular unit that may be selectively and quickly removed from a dog's collar or harness.

BRIEF SUMMARY OF THE INVENTION

An integrated animal tracking unit and stimulus unit is disclosed herein. The two units are removably coupled together and controlled by a common device. The tracking unit is affixed to an animal encircling device, i.e., a dog collar or a harness.

The tracking unit may be a Global Navigation Satellite Systems (GNSS) device that provides location information to the control device. At the same time, the stimulus unit is preferably configured to deliver an electrical stimulus through a pair of probes that contact the skin surface of the animal.

The tracking unit, or module, is beneficially provided with a receiving portion, which enables the stimulus unit to be docked to the tracking unit, or module. To this end, the tracking module preferably includes an extending male portion that is received by the receiving female portion to couple the tracking unit and the stimulus unit together. The extending portion and receiving portion may be provided in a dovetail configuration, and may be slidably connected to couple the tracking unit and the stimulus unit together. The tracking unit and the stimulus unit may be further secured together by one or more fastening members, such as screws.

When docked together, the training module may under one embodiment share the electrical circuitry and, preferably, the power supply of the tracking module.

BRIEF DESCRIPTION OF THE DRAWINGS

So that the manner in which the present inventions can be better understood, certain illustrations, charts and/or flow charts are appended hereto. It is to be noted, however, that the drawings illustrate only selected embodiments of the inventions and are therefore not to be considered limiting of scope, for the inventions may admit to other equally effective embodiments and applications.

FIG. 17 is intended to be a more complete showing of the modular dog collar of FIG. 6.

FIG. 26 is a side view of the integrated GPS tracking/E-collar system coupled to GPS and radio antennae, under an embodiment.

FIG. 27 is a top view of the integrated GPS tracking/E-collar system coupled to GPS and radio antennae, under an embodiment.

FIG. 28 is a front view of the integrated GPS tracking/E-collar system coupled to GPS and radio antennae, under an embodiment.

FIG. 31 also shows a decoupled E-collar unit next to the system, under an embodiment.

FIG. 32 also shows a decoupled E-collar unit next to the system, under an embodiment.

FIG. 33 also shows a decoupled E-collar unit next to the system, under an embodiment.

DETAILED DESCRIPTION OF CERTAIN EMBODIMENTS

Definitions

Figure 1:
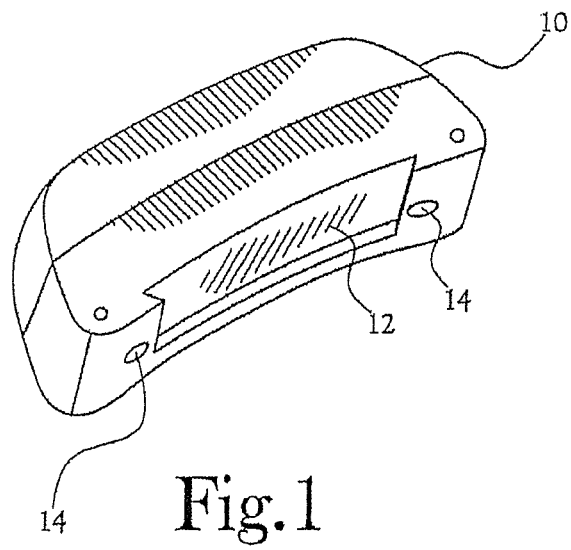
FIG. 1 is a perspective view of an animal tracking unit as may be used in the modular dog collar of the present invention, in one embodiment. The illustrative tracking unit includes a receiving portion.

For purposes of the present disclosure, it is noted that spatially relative terms, such as "up," "down," "right," "left," "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over or rotated, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Description Of Selected Specific Embodiments

Various embodiments of the present general inventive concept, as described herein, provide an animal tracking and control apparatus having a tracking unit to track an animal, and a stimulus unit to provide a stimulus to the animal. The tracking unit and stimulus unit are configured to be removably coupled together. In other words, the tracking unit and stimulus unit are formed such that the two units are able to be docked together. The coupling of the two units as modules may be referred to interchangeably throughout this description as docking.

The tracking unit and stimulus unit may transmit and/or receive signals to/from a common control device. In the various embodiments described herein, the control device is described as a remote handheld control device, or more simply a handheld transceiver. The single handheld transceiver communicates with both the stimulus unit and the tracking unit, and may send/receive signals to/from the units using different channels or different ID codes. Also, it is understood that the control device is not limited to any ornamental features shown in the handheld transceiver described in the drawings.

The animal tracking and control apparatus may be provided to any animal, but is typically described herein as being provided to a dog. For example, the animal tracking and control apparatus may be secured to an animal encircling device such as a dog collar which is worn by a dog, in order to track the dog's movements and provide a control stimulus to the dog. This is merely one non-limiting example of how the animal tracking and control apparatus may be utilized.

In an example embodiment in which the animal tracking and control apparatus is secured to the animal by an animal encircling device, such as a dog collar, either the tracking unit or the stimulus unit may be secured to the dog collar, and the other of the tracking unit or the stimulus unit is removably coupled to the unit secured to the dog collar. As an example, if the tracking unit is secured to the dog collar, the stimulus unit may be removed so that only the tracking unit is provided to the dog wearing the dog collar. Further, the animal tracking module may be provided with a cover to be removably coupled to the tracking module in lieu of the stimulus unit being in a coupled configuration.

In the examples illustrated and discussed throughout this description in which the animal tracking and control apparatus is secured to an animal encircling device such as a dog collar, the tracking unit is described as being secured to the dog collar. The dog collar is secured to the tracking unit by securing members such as screws, a molded collar that is permanently fastened to the tracking unit, a pass through woven collar, an attached woven collar, or a pass through molded collar.

The animal tracking unit may operate similarly to a typical Global Navigation Satellite System (GNSS) device. Various GNSS tracking systems, which employ GNSS systems such as the Global Positioning System (GPS) of the United States, the Russian GLONASS, etc., have been typically used to monitor the movement of a mobile subject such as an animal, often relative to a selected containment area. In such systems, the position and speed of the animal are monitored through the use of the GNSS satellites, and the position and speed of the animal may be displayed on a monitoring device. If a containment area is also employed, the containment area may also be displayed on the monitoring device.

The animal stimulus unit may operate similarly to various animal control apparatuses. For instance, the animal stimulus unit may provide the animal with various stimuli such as vibrations, sound or spray. Further, these various stimuli may be selectively provided to the animal, and the levels of the various stimuli may be adjusted. For example, a vibration provided to a dog to control a certain behavior may be increased if the dog does not respond to the previously used level of vibration stimulus. The animal stimulus unit may be provided with one or more protrusions to extend toward the animal's skin to make contact through the coat.

The previously described control device may be a handheld transceiver which sends/receives signals to/from the animal tracking module and stimulus module, and may have a display such as a graphic user interface (GUI) which may show the location of one or more animals equipped with the tracking module.

The handheld transceiver may have a plurality of controls to allow various operations such as switching the display emphasis between various hunting dogs being tracked and providing various stimuli levels to different dogs. The handheld transceiver may communicate with the tracking module using a different channel than the one used to communicate with the stimulus module.

Thus, an integrated animal tracking and control system provides a user or owner with an animal tracking or animal tracking/training system that can be user configured. In any of a number of example configurations, there is only one collar (or other animal encircling device) mounted device which is provided to the animal, and only one remote handheld control unit. The collar mounted device may under one embodiment include both the tracking unit and the stimulus unit in a configuration in which those units are docked together, and includes only one of the units in a configuration in which the units are not docked together. Such an apparatus and system greatly simplifies the mounting and operation of an animal training and/or tracking system. Such an apparatus and system also allows the sporting competitor to readily remove the training module for competition.

FIG. 1 is a perspective view of an animal tracking unit 10 as may be used in the modular dog collar of the present invention, in one embodiment. The illustrative tracking unit includes a receiving portion. The tracking unit 10 may receive GNSS signals and transmit position signals to a control device. In this example embodiment, the tracking unit 10 is provided with receiving portion 12 configured to receive a stimulus unit (see FIG. 2, 20) to be removably coupled to the tracking unit 10. In this example, the receiving portion is configured so as to form a dovetail connection with the coupled stimulus unit 20. It is understood that the dovetail connection is merely one configuration by which the tracking unit 10 will be docked with the coupled stimulus unit 20.

The tracking unit 10 of this example embodiment is also provided with holes 14 to receive screws to further secure the coupled stimulus unit 20 to the tracking unit 10. Although screws are described in this example embodiment, any type of adhesion member, such as bolts, brackets, clamps, and so on, may be used to further secure the coupled, or docked, units. Also, in other example embodiments, no adhesion members may be used to further secure the docking of the units. It is understood that the shape and dimensions of the tracking unit 10, as well as the other example units illustrated in the following drawings, are merely simple examples for illustrative purposes, and corresponding units in various embodiments of the present general inventive concept may vary widely in size, shape, composition, and so on.

The tracking unit 10 may further be provided with an antenna 60 (as described later in FIG. 6) or antennas (not shown) to transmit/receive GPS signals and/or signals to the control device. The antenna(s) may be integrated with an animal encircling device to which the tracking unit 10 is secured.

Figure 2:
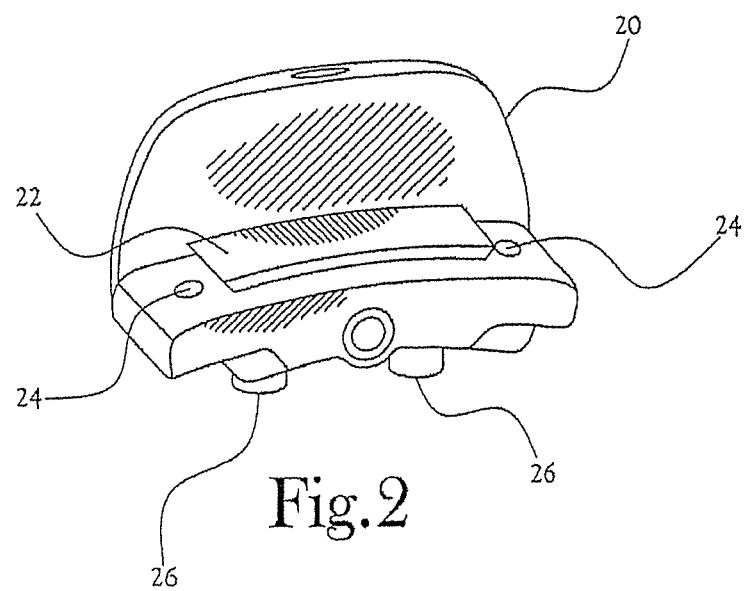
FIG. 2 is a perspective view of an animal stimulus unit as may be used in the modular dog collar of the present invention, in one embodiment. The illustrative stimulus unit includes an extending portion configured to engage the receiving portion of the animal tracking unit.

FIG. 2 is a perspective view of an animal stimulus unit 20 as may be used in the modular dog collar of the present invention, in one embodiment. The illustrative stimulus unit includes an extending portion configured to engage the receiving portion of the animal tracking unit. The stimulus unit 20 may receive control signals from the control device which also communicates with the tracking unit 10 in order to provide a stimulus to the animal. In this example embodiment the stimulus unit is provided with an extending portion 22 configured to slide into the receiving portion 12 of the tracking unit 10 in order to dock the stimulus unit 20 to the tracking unit 10 with a dovetail connection. It is understood that either of the tracking unit 10 or the stimulus unit 20 may be provided with the receiving portion 12, with the remaining one of the tracking unit 10 or the stimulus unit 20 being provided with the extending portion 22. Also, the coupling of the units may be achieved through configurations other than a receiving portion receiving an extending portion, and/or other than a slidable connection as illustrated in these drawings.

The stimulus unit 20 of this example embodiment is provided with through holes 24 through which screws may pass to further secure the docking of the tracking unit 10 and the stimulus unit 20. The screws, or other adhesion members, pass through the through holes 24 to the holes 14 of the tracking unit 10.

The stimulus unit 20 of this example embodiment is also provided with protrusions 26 which extend from the stimulus unit 20 to contact the skin of an animal and provide a stimulus, such as a vibration. The level of the stimulus may be adjusted through the control device communicating with the stimulus unit 20. The stimulus unit 20 may further have an antenna (not shown) to be used in transmitting and/or receiving control signals from the control device. It is understood that the protrusions 26 are merely an example of how the stimulus may be delivered to the animal.

Figure 3:
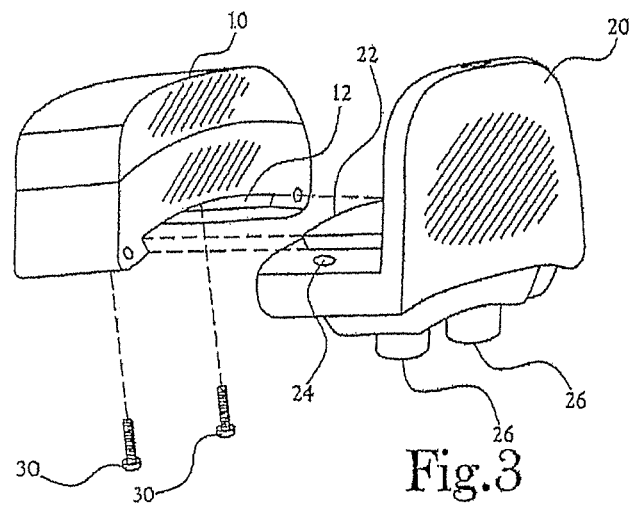
FIG. 3 is a perspective view of the animal tracking unit and animal stimulus unit from FIGS. 1 and 2. Here, the animal tracking unit of FIG. 1 and the stimulus unit of FIG. 2 are seen in exploded apart relation.

FIG. 3 is a perspective view of the animal tracking unit 10 and animal stimulus unit 20 from FIGS. 1 and 2. Here, the animal tracking unit of FIG. 1 and the stimulus unit of FIG. 2 are seen in exploded apart relation. As illustrated, the extending portion 22 of the stimulus unit 20 slides into the receiving portion 12 of the tracking unit 10 to form a dovetail connection. After the docking is achieved, screws 30 may be screwed into the holes 14 of the tracking unit 10 through the through holes 24 of the stimulus unit 20 in order to further secure the docking of the units.

Although not illustrated in these drawings, each of the tracking unit 10 and the stimulus unit 20 may be provided with on/off buttons, on/off indicators, charging jacks, and other similar features typically provided to electric/electronic devices. Also, the stimulus unit 20 may be provided with an internal or external antenna to be used in communication with the control device, and the tracking unit 10 may be provided with one or more internal and/or external antennas to be used in communication with the control device and/or GNSS satellites. One or more of the various antennas may be integrated with or supported by an animal encircling device to which the animal tracking and control apparatus is attached. These features have largely been omitted from the drawings to present a more clear illustration of the docking feature of the units.

Figure 4:
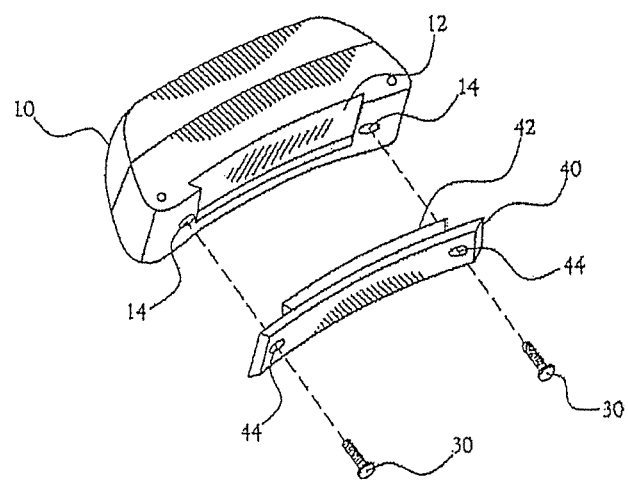
FIG. 4 is a perspective view of the animal tracking unit of FIG. 1. Here, the tracking unit is ready to receive a removable cover, shown in exploded apart relation.

FIG. 4 is a perspective view of the animal tracking unit 10 of FIG. 1. Here, the tracking unit 10 is ready to receive a removable cover 40, shown in exploded apart relation. The cover 40 is provided with an extending portion 42 that corresponds to the extending portion 22 of the stimulus unit 20, and which slides into the receiving portion 12 of the tracking unit 10 to form a dovetail connection in the same manner as that formed between the tracking unit 10 and the stimulus unit 20. The cover is also provided with through holes 44 through which the screws 30 may be screwed into the holes 14 of the tracking unit 10 to further secure the cover 40 to the tracking unit 10.

Figure 5A:
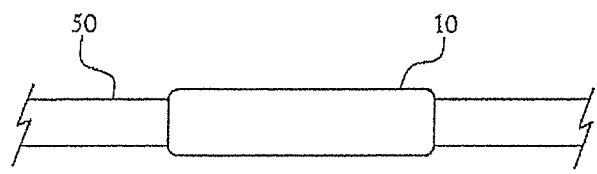
FIGS. 5A through 5C illustrate the docking of the stimulus unit to the tracking unit while fixed to an animal collar.
Figure 5B:
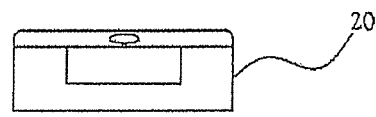
Figure 5C:
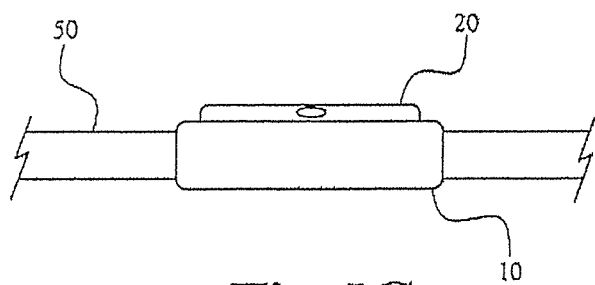

FIGS. 5A through 5C illustrate the docking of the stimulus unit 20 to the tracking unit 10 while fixed to an animal collar 50. These drawings are highly simplified in order to illustrate an "outside" view of the tracking unit 10 and stimulus unit 20 as provided to the animal encircling device (or collar or harness) 50 so as to be mounted on an animal. In FIG. 5A, the tracking unit 10 is fixed to the animal encircling device 50, an example of which may be a dog collar. The tracking unit 10 may be fixed to the dog collar 50 in any number of ways, and may be permanently or removably fixed to the dog collar 50.

FIG. 5B is a simple "outside" view of the stimulus unit 20, the "outside" orientation indicating the view from directly outside portions of the dog collar 50 adjacent to the tracking unit 10 in FIGS. 5A and 5C. In other words, the "outside" view is that of one looking at a dog wearing the dog collar 50.

FIG. 5C illustrates the stimulus unit 20 docked to the tracking unit 10.

Figure 6:
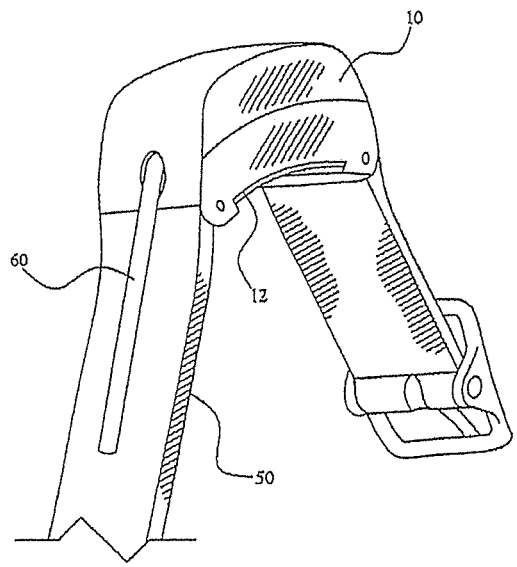
FIG. 6 is a perspective view of a portion of a modular dog tracking collar of the present invention, in one embodiment. The animal tracking unit is affixed to a dog collar, but without the stimulus unit.

FIG. 6 is a perspective view of a portion of a modular dog tracking collar 50 of the present invention, in one embodiment. The animal tracking unit 10 is affixed to a dog collar 50, but without the stimulus unit. As illustrated in FIG. 6, the receiving portion 12 of the tracking unit 10 is located on the inner side of the tracking unit 10, which is the side of the tracking unit 10 that is facing the animal, e.g., the dog. The tracking unit 10 is able to track the dog and communicate with the control device regardless of whether the stimulus unit 20 is docked with the tracking unit 10.

FIG. 6 also illustrates an antenna 60 provided to the tracking unit 10, which has been omitted from various other illustrated embodiments for the sake of clarity. As previously described, the tracking unit may be provided with more than one antenna.

Figure 7:
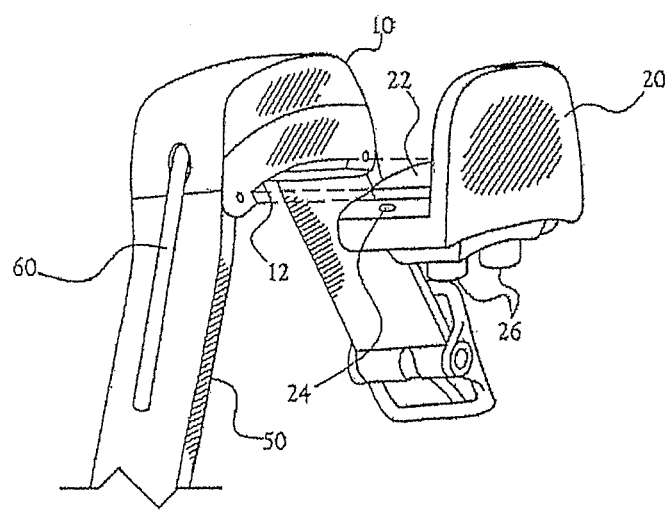
FIG. 7 is a perspective view of the modular dog collar of FIG. 6. Here, the stimulus unit is shown in exploded-apart relation to the animal tracking unit.

FIG. 7 is a perspective view of the modular dog collar 50 of FIG. 6. Here, the stimulus unit 20 is shown in exploded-apart relation to the animal tracking unit 10. As illustrated in FIG. 7, the extending portion 22 of the stimulus unit 20 slides into the receiving portion 12 of the tracking unit 10 to dock the units in a dovetail connection. Once docked, the protrusions 26 extend away from the tracking unit 10 and stimulus unit 20 toward the dog wearing the dog collar 50.

Figure 8:
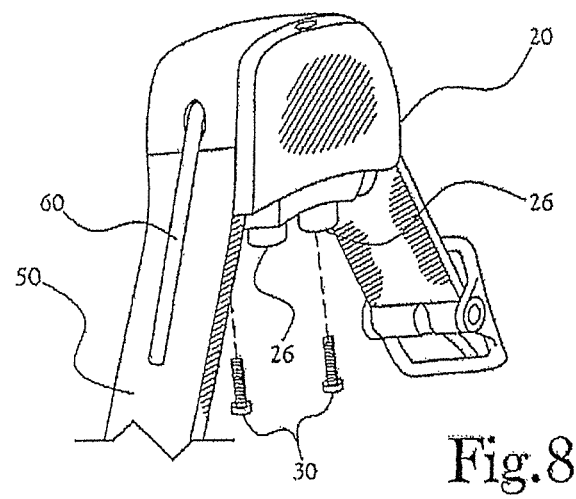
FIG. 8 is a perspective view of the modular dog collar of FIG. 7. Here, the stimulus unit has been docked with the animal tracking unit, forming an integral modular dog collar.

FIG. 8 is a perspective view of the modular dog collar 50 of FIG. 7. Here, the stimulus unit 10 has been docked with the animal tracking unit 20, forming an integral modular dog collar. As illustrated in FIG. 8, the screws 30 pass through the through holes 24 of the stimulus unit 20 to screw into the holes 14 of the tracking unit 10. While the screws 30 further secure the docking of the stimulus unit 20 to the tracking unit 10, it is understood that such further securing and adhesion members are not required under other various embodiments.

Figure 9:
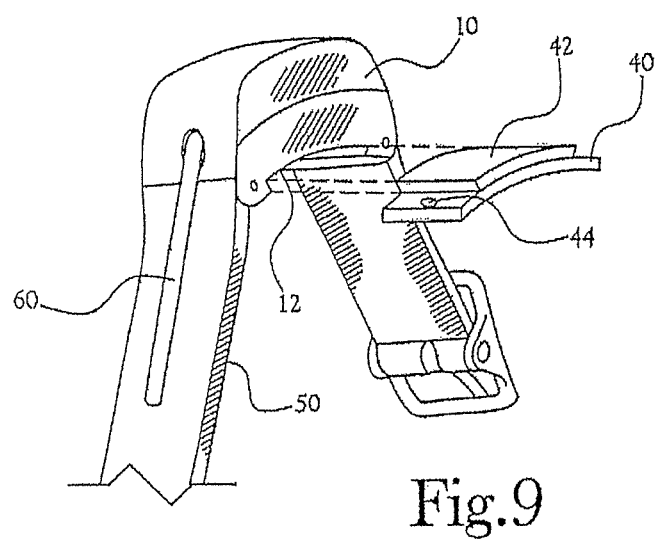
FIG. 9 is another perspective view of the modular dog collar of FIG. 6. Here, a removable cover is shown in exploded-apart relation to the animal tracking unit.

FIG. 9 is another perspective view of the modular dog collar 50 of FIG. 6. Here, a removable cover 40 is shown in exploded-apart relation to the animal tracking unit. As illustrated in FIG. 9, the extending portion 42 of the cover 40 slides into the receiving portion 12 of the tracking unit 10 to couple the cover to the tracking unit 10 in a dovetail connection. The use of the cover 40, in the absence of the stimulus unit 20, provides a smooth contact surface to increase the comfort of the dog wearing the dog collar 50.

Figure 10:
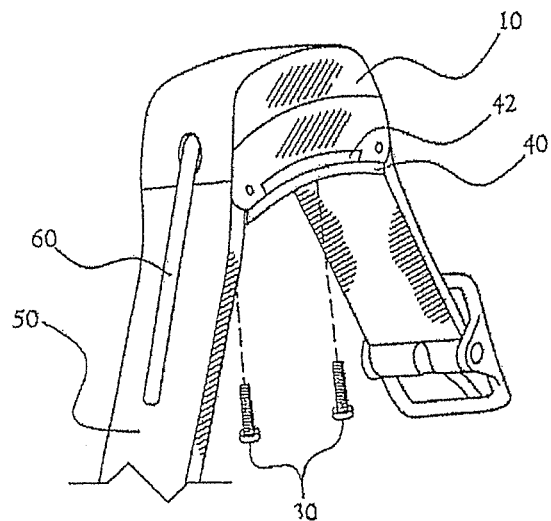
FIG. 10 is a perspective view of the modular dog collar of FIG. 9. Here, the removable cover has been docked with the animal tracking unit.

FIG. 10 is a perspective view of the modular dog collar 50 of FIG. 9. Here, the removable cover has been docked with the animal tracking unit 10. As illustrated in FIG. 10, the screws 30 pass through the through holes 44 of the cover 40 to screw into the holes 14 of the tracking unit 10. While the screws 30 further secure the cover 40 to the tracking unit 10, it is understood that such further securing and adhesion members are not required under other various embodiments.

Figure 11:
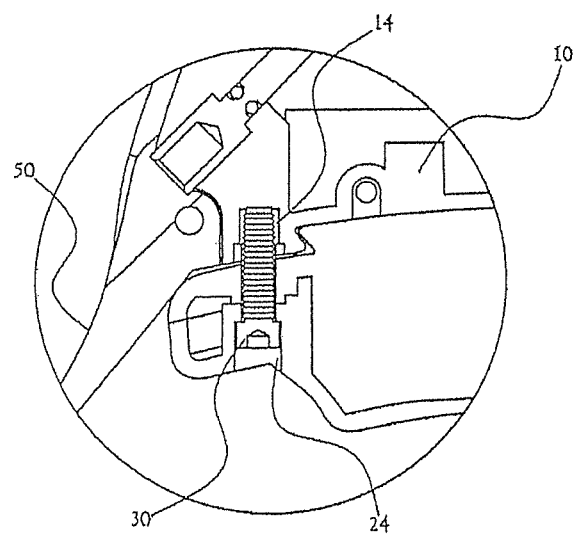
FIG. 11 is an enlarged partial cross-section of the docked tracking unit and stimulus unit. A screw is shown securing the two docked components together.

FIG. 11 is an enlarged partial cross-section of the docked tracking unit 10 and stimulus unit 20. A screw 30 is shown securing the two docked components together. As illustrated in FIG. 11, the screw 30 is extends through the through hole 24 of the stimulus unit 20 to screw into the hole 14 of the tracking unit 10, further securing the docking of the stimulus unit 20 and the tracking unit 10. While the screws 30 further secure the docking of the stimulus unit 20 to the tracking unit 10, it is understood that such further securing and adhesion members are not required under various other embodiments.

Figure 12:
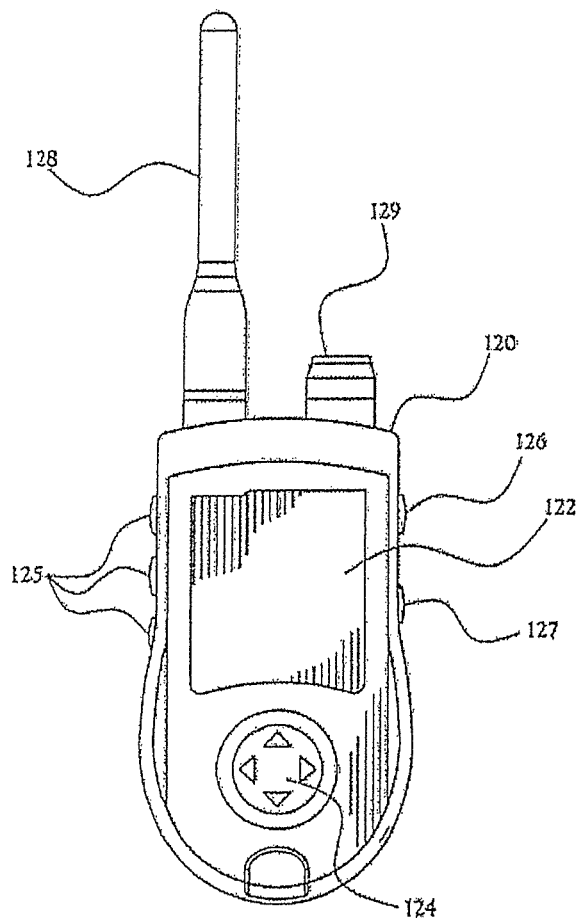
FIG. 12 is a plan view of a control device used to control the tracking unit and the stimulus unit of FIG. 8, in one embodiment.

FIG. 12 is a view of a control device 120 used to control the tracking unit and the stimulus unit of FIG. 8, in one embodiment. As illustrated in FIG. 12, this example control device 120 is a remote handheld control device. The control device 120 is provided with a display 122 to display a graphical user interface (GUI), a direction button 124 to interface with the GUI, a plurality of stimulus buttons 125, a back button 126, a tracking/training toggle button 127, a GNSS antenna 129, and a control device antenna 128.

The control device 120 determines a user's location from a built-in GPS antenna 129. The built-in GPS antenna receives location updates from a GPS antenna provided to the tracking unit 10 to track the location of the animal equipped with the tracking and control apparatus. The GPS antenna provided to the tracking unit 10 may be mounted on the dog collar 50. The display 122 may display the user's location, the location of one or more animals provided with the animal tracking and control apparatus relative to the user or to a predetermined area, a list of options for stimulating the respective animals, levels of stimulation, and so on. The stimulus buttons 125 may be used to send a signal to activate the stimulus unit 20 to deliver a stimulus to the animal. As previously described, the level of the stimulus is adjustable through the control device 120.

The control device 120 under an embodiment may communicate with the tracking unit 10 and the stimulus unit 20 on separate channels in order to minimize interference between the respective signals.

FIGS. 13 through 16 illustrate various displays and graphical heading indicators, which may be shown on the control device 120 of FIG. 12 using display 122 according to various examples. Referring to FIGS. 13 through 16, the example display screens 122 provided by the control device 120 include tracking information for three different dogs, as generally represented by the display icons corresponding to the current direction and location of the animal and/or past locations and directions of the animal. In the example embodiments, the animals being tracked are referred to in some of the figures as Ripley, Talon, and Lulu, respectively. Note that the present general inventive concept is not limited to any particular number of tracked animals. Moreover, although the example embodiments of FIGS. 13 through 16 illustrate various different dogs being tracked, the present general inventive concept is not limited to any particular number or type of animal.

Figure 13:
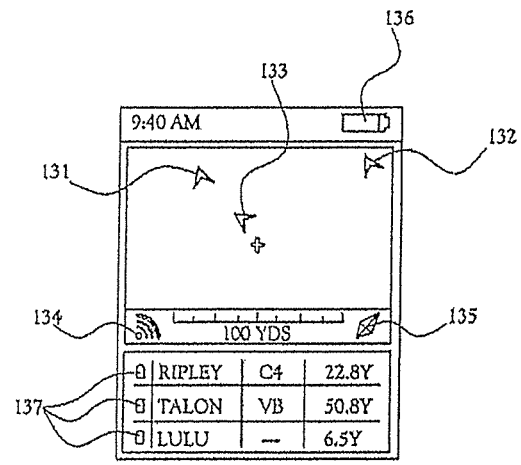
FIG. 13 illustrates a display screen generated by the control device of FIG. 12, in one example.

FIG. 13 illustrates a display screen 122 generated by the control device 120 of FIG. 12, in one example. In FIG. 13, the three different direction indicator arrows 131, 132, 133 correspond to the current location and direction, or heading, of the respective animals relative to the user's position. The cross-hair in the middle of the screen can be used to represent the current location of the user, although the present general inventive concept is not limited to any particular type of graphical indicators, or icons, to represent the animal and user. For example, the graphical representations of the animals could take the form of an animal-shaped icon. In various example embodiments, the head of the animal could be used to indicate the current direction of the animal, and the body of the animal could be used to indicate the current location of the animal based on the current scale of the display screen. The icons can indicate whether the dog is running, on point, treed, stationary, barking, and the like, and the movement of the user.

Although the user's location is represented in the illustrated embodiments as a cross-hair, it is possible to display the location and heading of the user using any number of icons, such as a human figure, arrow, circle, or other icon.

The orientation of the direction arrow (e.g., up, down, left right, etc.) can represent the current heading or direction of the animal and user relative to one another, and the icons can be color coded so the user knows which icon corresponds to each dog by the color of the icon matching the color of the text.

The display 122 can include an incremented scale to provide a visual representation of the actual distance between the user and the respective animals, and can display the actual calculated distances from the user for each animal. The user has the option to keep the scale at a fixed distance (e.g., 100 yards), or the user can select Auto where the scale will automatically adjust in real time once the animal goes outside the scale. The unit can periodically check to see if any of the animals are outside the scale and can zoom to a level where all the animals are visible on the screen. If the animal is lost or off-screen, a graphical indicator, such as an outline of the icon or a blinking icon representing the animal can be provided to the user, or a separate tab can be provided showing the animal's location in relation to the scaled display.

In FIG. 13, Ripley is represented as 131; Talon as 132; and Lulu as 133. Ripley 131 is shown located 22.8 yards from the user and provided with continuous stimulation C4 according to one of the stimulus buttons 125; Talon 132 is shown located 50.8 yards from the user and provided with vibration stimulation VB according to one of the stimulus buttons 125; and Lulu 133 is shown located 6.5 yards from the user with no stimulation provided. The stimulation buttons 125 of the control device 120 can be selectively assigned to each dog, respectively, and used to provide the corresponding stimulus as desired by the user.

The display can include a GPS fix indicator 134, compass indicator 135, and battery indicator 136. The display can also include separate battery level indicators 137 corresponding to the battery level of the individual GPS units, respectively. In various example embodiments, the GPS fix indicator 134 can indicate whether the control device 120 has achieved a 'fix' on the animals as determined by a GPS engine. The compass indicator 135 can indicate the current orientation of the control device 120 as determined by the compass unit.

Figure 14:
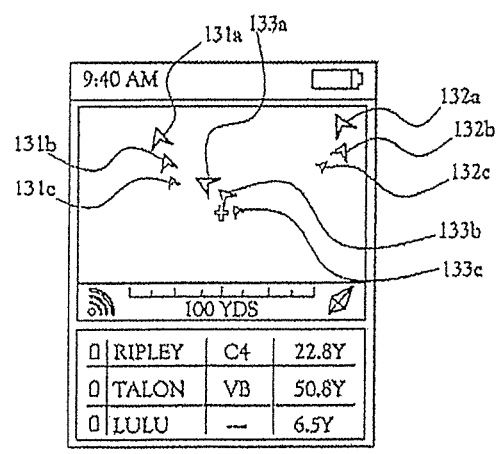
FIG. 14 illustrates another display screen generated by the control device of FIG. 12, in one example.

FIG. 14 illustrates another display screen 122 generated by the control device of FIG. 12, in one example. In FIG. 14, similar to FIG. 13, the three large direction indicator arrows 131a, 132a, 133a correspond to the current location and direction of the animals relative to the user's position. However, FIG. 14 includes a plurality of additional and smaller indicator arrows 131a, 131b, 131c; 132a, 132b, 132c; 133a, 133b, 133c, corresponding to a plurality of historical data points relative to each animal's movement. These additional data points are represented in the form of smaller (i.e., subdued) arrows, although any other shape, number, and/or size of icons could be used.

In FIG. 14, the smaller historical data points can be displayed in an incrementally subdued fashion such that the oldest data point is displayed in a lighter or fainter strength, whereas the most current data point is displayed in full strength, to provide a visual representation of the historical trail of the animal. Thus, the movement and data points transmitted by the first device can be received and displayed by the second device to provide a historical mapping as well as current location and direction information of the animal's movement relative to the user.

Figure 15:
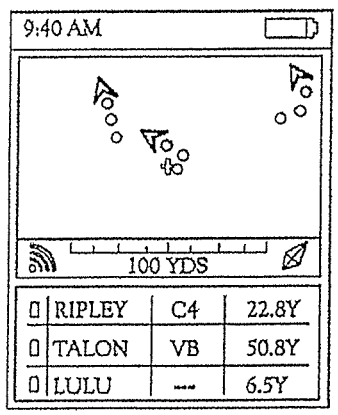
FIG. 15 illustrates another display screen generated by the control device of FIG. 12, in one example.

FIG. 15 illustrates another display screen 122 generated by the control device 120 of FIG. 12, in one example. In FIG. 15, similar to FIGS. 13 and 14, the three large direction indicator arrows correspond to the current location and direction of the animals relative to the user's position. However, FIG. 15 includes a plurality of circles 131d, 132d, 133d corresponding to historical data points relative to the animal's movement. Although these additional data points are represented in the form of circles, any other shape, size, and number of icons could be used. The smaller circles representing historical data points can be displayed in an incrementally subdued fashion such that the oldest data point is displayed in a lighter or fainter strength, whereas the most current data point is displayed in full strength, to provide a visual representation of the historical trail of the animal. Thus, similar to the example embodiment of FIG. 14, the movement and data points transmitted by the first device (or tracking unit 10) can be received and displayed by the second device (or control device 120) to provide a historical mapping as well as current location and direction information of the animal's movement relative to the user.

Figure 16:
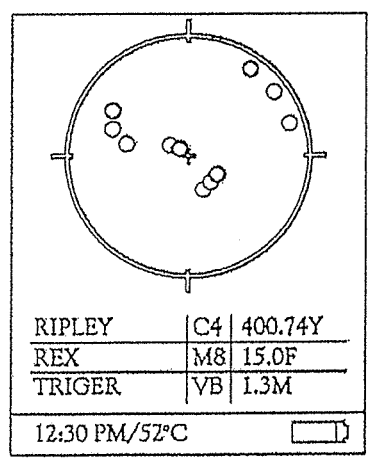
FIG. 16 illustrates another display screen generated by the control device of FIG. 12, in one example.

FIG. 16 illustrates another display screen generated by the control device 120 of FIG. 12, in one example. FIG. 16 includes a plurality of circles 131e, 132e, 133e corresponding to historical data points relative to the animal's movement, but does not include the three large indicator arrows. These historical data points are represented in the form of circles, although any other shape, size, and number could be used. In FIG. 16, similar to FIG. 15, the smaller circles representing historical data points can be displayed in an incrementally subdued fashion such that the oldest data point is displayed in a lighter or fainter strength, whereas the most current data point is displayed in full strength, to provide a visual representation of the historical trail of the animal. Thus, the movement and data points transmitted by the first device (or tracking unit 10) can be received and displayed by the second device (or control device 120) to provide a historical mapping of the animal's movement relative to the user, with the most recent circle also providing the current location of the first device.

In the example embodiments, the change of position between the most recent data point and the prior data point can be used to provide a directional vector, or indicator, indicating the dog's recent movement. This vector information can be used to graphically display the dog's current heading in relation to the user. In the example embodiments, the dog's current heading can be indicated by an arrow while the historical location data points are displayed as dots or circles, although it is possible that any other shape or number of data points could be used without departing from the broader scope and teachings of the present general inventive concept.

The user can select to display a complete history of the paths taken by the respective animals, a partial history, or no history at all. The historical paths can take the form of a series of icons, historical data points, or a continuous path line or bread-crumb trail to show the path of the animal over time. For example, if the screen becomes cluttered with numerous paths, the user can selectively choose the length of paths shown, or no paths shown. The handheld control device can be programmed to automatically refresh the display screen at predetermined intervals or lengths of trails to maintain a fresh looking display.

Figure 17:
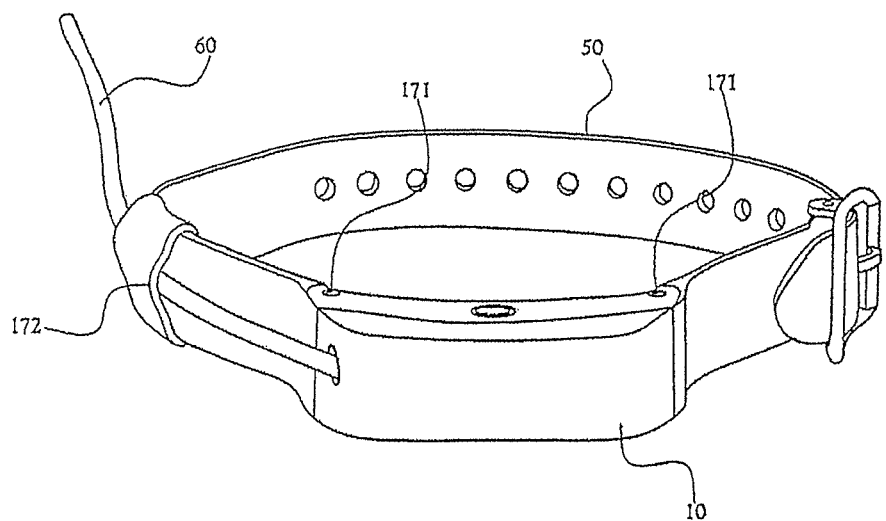
FIG. 17 is a perspective view of a modular dog tracking collar of the present invention, in one embodiment. The collar includes an animal tracking unit and docked stimulus unit.

FIG. 17 is a perspective view of a modular dog tracking collar under an embodiment. The collar includes an animal tracking unit 10 and docked stimulus unit 20. FIG. 17 is intended to be a more complete showing of the modular dog collar of FIG. 6. In FIG. 17, the dog collar 50 is affixed to the tracking unit 10 with screws 171. The animal encircling device 50 may be provided with a loop 172 to secure a positioning of the antenna 60.

Figure 18:
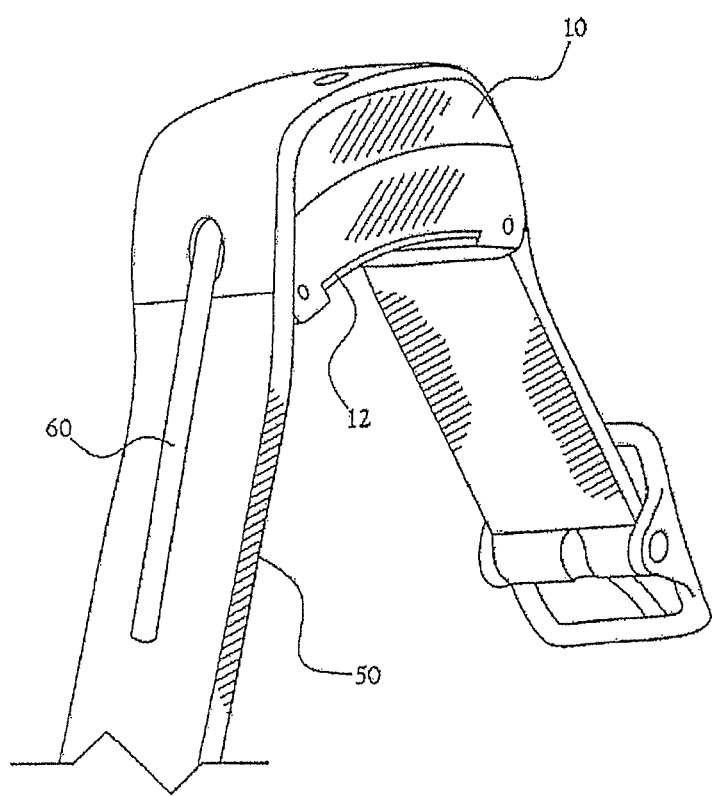
FIG. 18 is a perspective view of the animal tracking unit and docked stimulus unit from FIG. 17.

FIG. 18 illustrates a view of the tracking unit 10 fixed to the dog collar 50 according to another embodiment of the present general inventive concept. FIG. 18 is similar to FIG. 6 except that dog collar 50 wraps over the tracking unit 10 on a surface facing away from the dog, rather than being fixed to ends of the tracking unit 50 with screws 171 as in FIG. 17. As previously described, any number of collars and methods of fixing the collars to the tracking unit 10 may be used.

Under an alternative embodiment to the animal tracking and control system described above, the stimulation unit may be a slave device to the tracking unit. The alternative embodiment comprises a stimulation unit/module (hereinafter referred to as a modular E-collar unit or stimulus unit) which mates with a stand-alone tracking unit/module (hereinafter referred to as a stand-alone GPS tracking unit or tracking unit) to form an integrated GPS tracking/E-collar system. As the principle difference from the tracking/control systems described above, the E-collar unit is entirely a slave device and has no smart circuitry, no independent power supply and no antenna. Accordingly, the modular E-collar unit is dependent upon the GPS tracking unit for its power supply, for its general operation and for communication to and from a remote hand held control device. The integrated system is further described below with reference to FIGS. 19-36.

Figure 19:
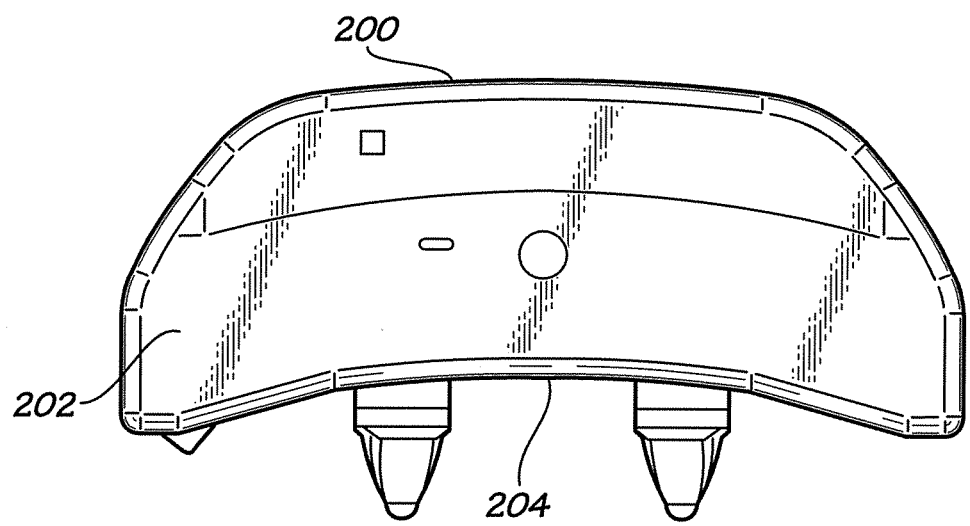
FIG. 19 is a front view of an integrated GPS tracking/E-collar system, under an embodiment.

FIG. 19 is a front view of the integrated GPS tracking/E-collar system 200. The system 200 features the GPS tracking unit 202 coupled with the E-collar unit 204.

Figure 20:
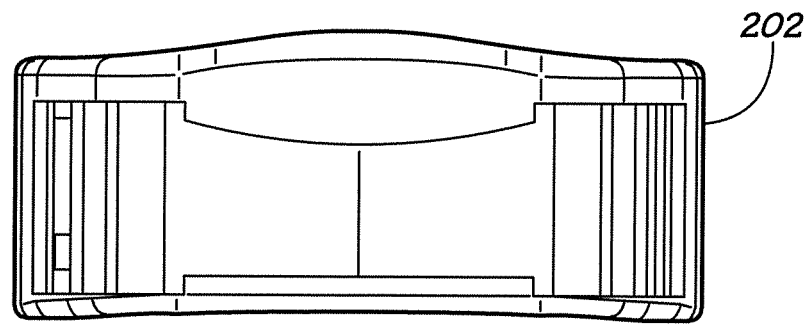
FIG. 20 is a top down view of an integrated GPS tracking/E-collar system, under an embodiment.

FIG. 20 is a top down view of the integrated GPS tracking/E-collar system 200.

Figure 21:
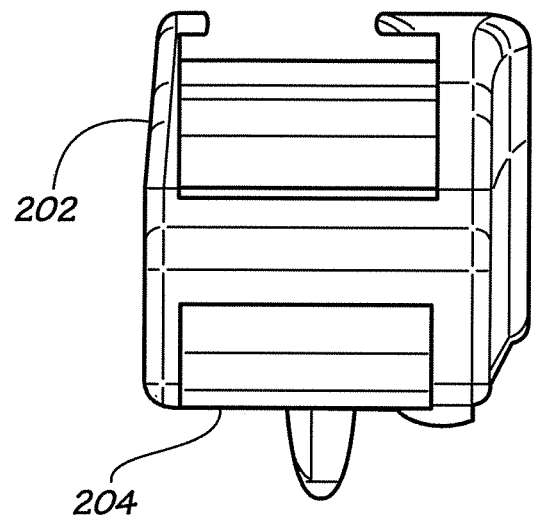
FIG. 21 is a side view of an integrated GPS tracking/E-collar system, under an embodiment.

FIG. 21 is a side view of the integrated GPS tracking/E-collar system 200 comprising the GPS tracking unit 202 coupled with the E-collar unit 204.

Figure 22:
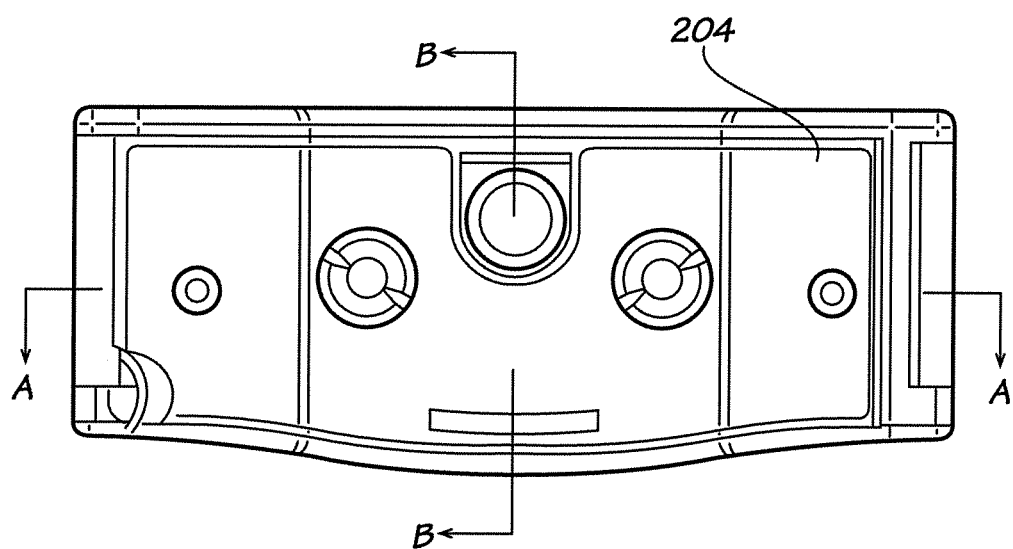
FIG. 22 is a bottom view of the integrated GPS tracking/E-collar system, under an embodiment.

FIG. 22 is a bottom view of the integrated GPS tracking/E-collar system 200. The bottom view as seen in FIG. 22 comprises a bottom view of a modular E-collar unit 204 secured to the GPS tracking unit.

Figure 23A:
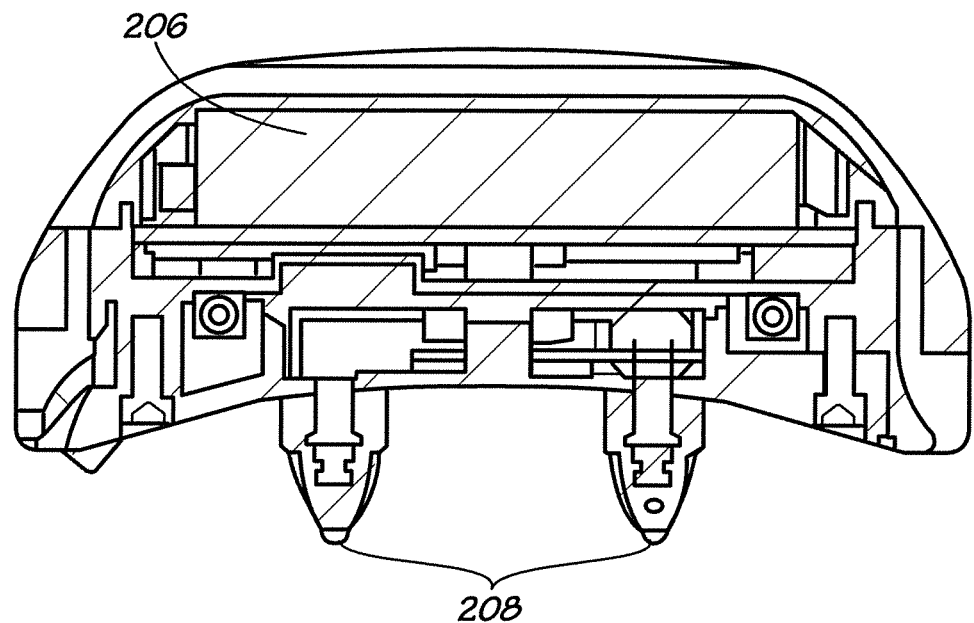
FIGS. 23A and 23B are cross-sectional views of the integrated GPS tracking/E-collar system, under an embodiment.
Figure 23B:
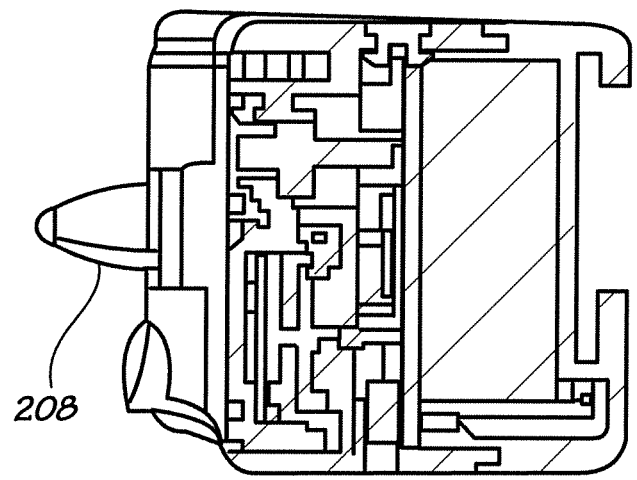

FIGS. 23A and 23B are cross-sectional views of the integrated GPS tracking/E-collar system 200. FIG. 23A is taken across Line A-A of FIG. 22, while FIG. 23B is taken across Line B-B of FIG. 22. FIG. 23A shows the power supply 206 of the GPS tracking unit 202. The power supply may include a lithium ion polymer battery. Both FIGS. 23A and 23B show the stimulus probes 208 extending from the E-collar unit. Under an embodiment, the GPS tracking unit 202 receives command signals from a remote handheld control unit or transceiver. In response to such signals, the GPS tracking unit may communicate with the E-collar unit through the signal contacts (FIG. 24, 216) to initiate application of a stimulus to the animal through stimulus probes 208.

As already noted above, the E-collar unit 204 preferably does not have its own firmware or microcontroller or other "smart circuitry." Further, the E-collar unit 204 preferably does not have its own battery or other power supply. Still further, the E-collar unit 204 preferably does not have its own antenna. Instead, the E-collar unit 204 operates essentially as a slave system dependent on the GPS tracking unit 202 for operation and communication back to the hand held device. Note that such handheld device is not shown in FIGS. 19-33 but is analogous to the handheld device 120 described in FIG. 12 above.

Figure 24:
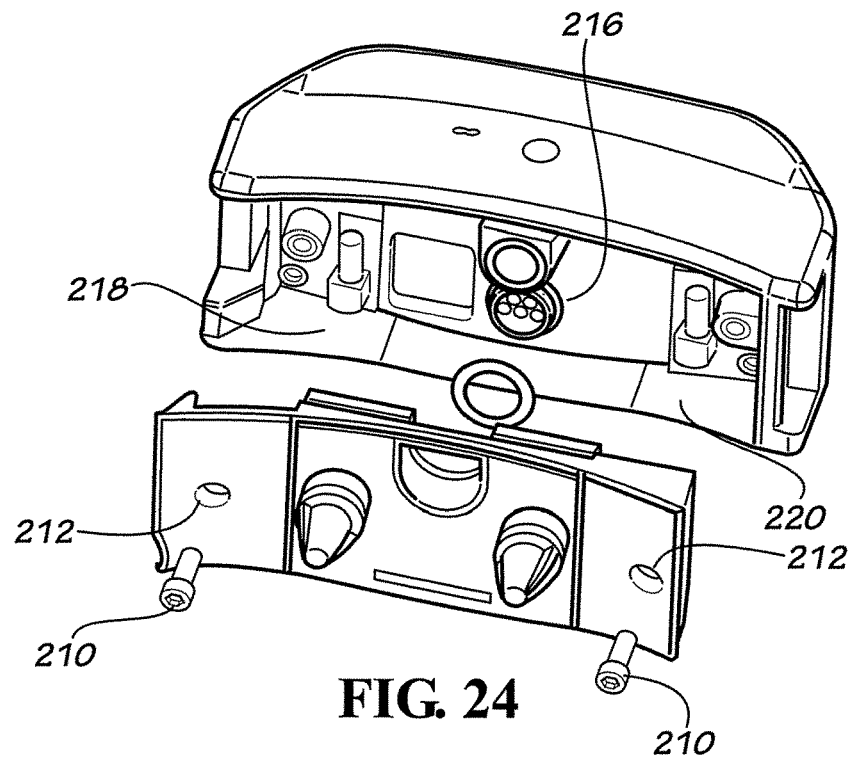
FIG. 24 shows an exploded view of the integrated GPS tracking/E-collar system, under an embodiment.

FIGS. 19-23 show the E-collar unit 204 secured to the GPS tracking unit 202. FIG. 24 shows an exploded view of the integrated GPS tracking/E-collar system. FIG. 24 displays the fasteners 210 which pass through holes 212 in the E-collar unit 204 to secure the E-collar unit 204 to the GPS tracking unit 202. Using the fasteners 210, the modular E-collar unit 204 may under an embodiment be easily secured to or removed from the GPS tracking unit 202.

FIG. 24 also shows the signal contacts 216 of the GPS tracking unit 202. When the E-collar unit 204 is secured to the GPS tracking unit 202, the tracking side signal connections 216 couple with the E-collar (i.e. stimulus unit) signal connections (not shown) and are surrounded by a water tight seal system which provides a hermetically sealed communication pathway between the E-collar unit and the GPS tracking unit. The signal contacts may be electrical but embodiments are not so limited. The contacts may comprise pogo pin or metal spring connections. As another example, the contacts may comprise an optical coupling.

Once the E-collar unit is fastened to the GPS tracking unit, a microcontroller of the GPS tracking unit 202 automatically detects that the E-collar stimulus unit 204 has been installed and begins to communicate with the unit 204 based on instructions received from a hand held control device. A microcontroller (further disclosed in FIG. 30 below) housed in the tracking unit features a detection pin coupled to the signal contacts of the GPS tracking unit 202 which detects the presence of a connected E-collar unit 204 thereby initiating communication. Due to the fact that the modular E-collar is a slave device, the GPS unit 202 provides identical tracking functionality without the E-collar. When the microcontroller of the GPS tracking unit fails to detect the presence of a communication coupling with signal contacts of the E-collar unit, the GPS tracking unit simply operates as a stand-alone unit without the stimulus functionality otherwise provided by the E-collar unit. The easy removal of E-collar stimulus unit recommends the unit for use in dog competitions in which competing dogs are not allowed to wear any form of stimulus device during competition performances. When the E-collar unit is disengaged from the GPS tracking unit, a user of the integrated system may replace the active unit with a dummy (or rather inactive) E-collar unit.

Note that the stimulus applied by the E-collar stimulus unit may be electrical but embodiments are not so limited. Under alternative embodiments, the applied stimulus may be noise, tone or vibration. Further, when the E-collar unit is disengaged from the GPS tracking unit, the tracking unit may not apply any stimulus to an animal.

FIG. 24 also displays a GPS co-axial cable connector 218 and a radio co-axial cable connector 220 which respectively couple with a GPS antenna and a radio antenna. The GPS antenna and a radio antenna are shown below in FIGS. 26-28.

Figure 25:
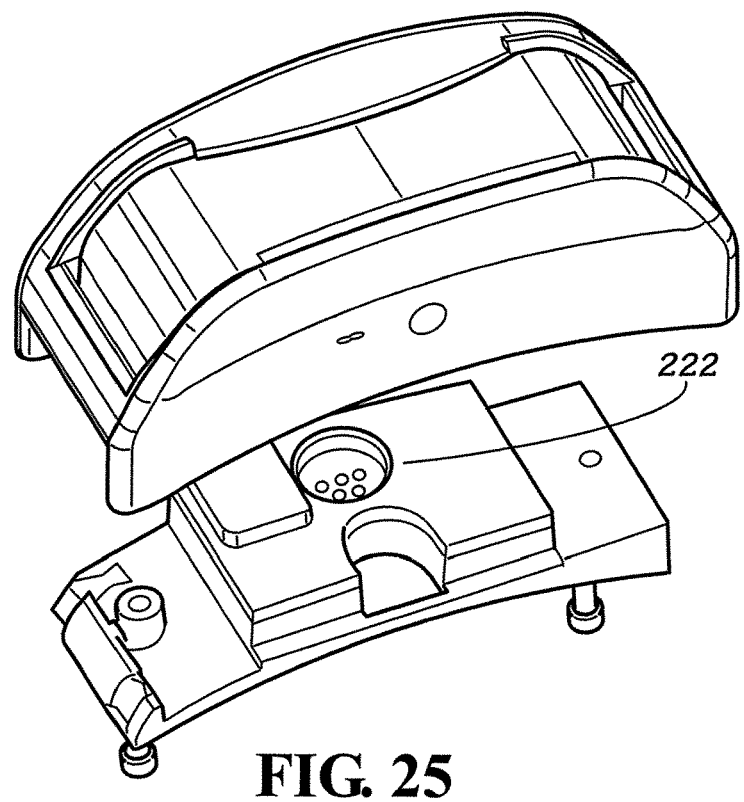
FIG. 25 provides another exploded view of the integrated GPS tracking/E-collar system, under an embodiment.

FIG. 25 provides another exploded view of the integrated GPS tracking/E-collar system. The E-collar signal contacts 222 are seen on the E-collar unit.

FIG. 26 is a side view of the integrated GPS tracking/E-collar system. The GPS unit co-axial cable connector 218 is coupled to the GPS antenna 226 using a GPS co-axial cable 224. The E-collar unit radio co-axial cable connector 220 is coupled to the radio antenna 228.

FIG. 27 is a top view of the integrated GPS tracking/E-collar system from FIG. 26.

FIG. 28 is a front view of the integrated GPS tracking/E-collar system from FIG. 26.

Figure 29:
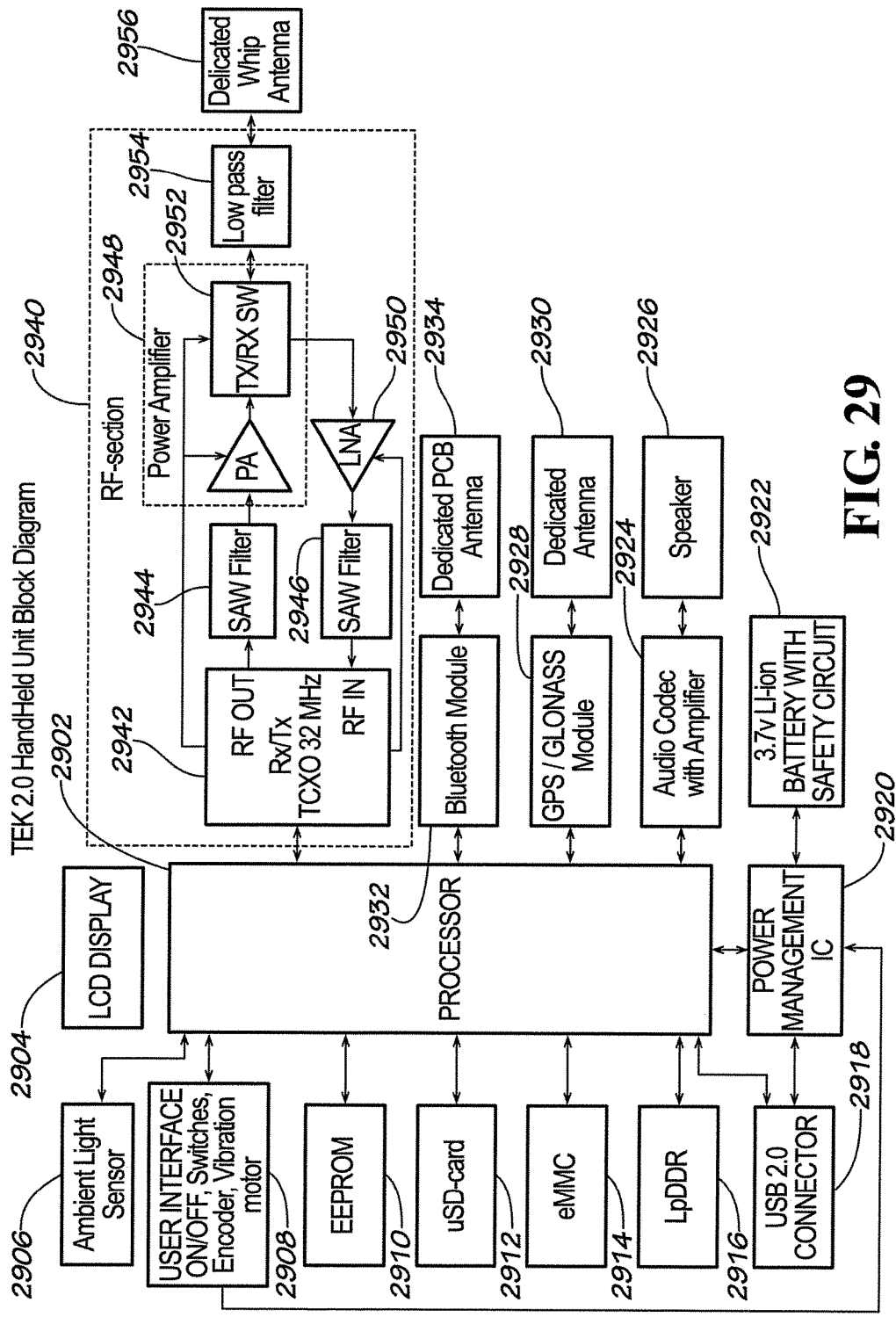
FIG. 29 is a unit block diagram describing circuitry of a handheld control device, under an embodiment.

As indicated above, the GPS tracking unit communicates with a handheld control device. The handheld control device comprises under one embodiment a TEK 2.0 handheld unit. FIG. 29 comprises a unit block diagram representing circuitry of a handheld control device. The circuitry includes a processor 2902. The processor is coupled to an LCD display 2904 which presents data and graphics to a user. The processor is also coupled to an ambient light sensor 2906. Under one embodiment, the sensor measures ambient light levels of the device's environment. The processor may adjust the LCD display back light brightness based on measured ambient light levels. The processor 2902 may adjust LCD display back light brightness using a power management-integrated circuit 2920.

The processor 2902 is coupled to memory modules 2910-2916. The memory modules include EEPROM (Electronically Erasable Read-Only Memory) 2910. EEPROM comprises a type of non-volatile memory used in computers and other electronic devices to store small amounts of data that must be saved when power is removed, e.g., calibration tables or device configuration. Under one embodiment, EEPROM 2910 stores settings and calibration data for the handheld control device. The memory modules also include LPDDR1 2916 which comprises low power double data rate synchronous DRAM (Dynamic Random Access Memory). LPDDR1 2916 provides the processor 2902 a 200 MHz bus for RAM memory usage. The memory module also includes an eMMC component 2914. Under one embodiment eMMC architecture provides MultiMediaCard flash memory for use in circuit boards as an embedded non-volatile memory system. The eMMC component 2914 provides memory for the device's operating system, maps and applications under one embodiment. The memory modules also include uSD card component 2912. Under one embodiment, a uSD card is removably coupled to a uSD card reader. This uSD card may store special maps and files of a user.

The processor 2902 is also coupled to a user interface 2908. The interface 2908 includes an On/Off button, switches, a rotary encoder and vibration motor. Under one embodiment, a user manipulates the rotary encoder to move one or more cursors among interface menu items. Under one embodiment, a user implements switches to make selections and settings for general operation of the device. Under one embodiment, a user manipulates buttons located on a side of the device to send stimulation commands to the GPS tracking unit for communication to the stimulus unit (E-collar unit 204). The user interface also includes a vibration module to provide alarms and warnings to the user.

The processor 2902 is also coupled to a GPS/GLONASS Module 2928. The GPS/GLONASS module comprises a parallel GPS/GNSS receiver with 99 channels for searching satellite transmissions and 33 channels for tracking the GPS tracking unit. The GPS/GLONASS module is coupled to a dedicated antenna 2930.

The processor 2902 is coupled to a Power Management Integrated Circuit (PMIC) 2920. Under an embodiment, power management integrated circuits (power management ICs or PMICs) are integrated circuits for managing power requirements of a host circuit/system. The PMIC 2920 may include an integrated linear recharger for the Lithium-ion battery 2922 coupled to the PMIC. Further, the PMIC regulates all used voltages for the processor and accessories. The Lithium-ion battery includes an integrated safety circuit and a Negative Temperature Coefficient (NTC) resistor.

The processor 2902 is also coupled to an Audio Codec module 2924. An audio codec is a device or computer program capable of coding or decoding a digital stream of audio. In software, an audio codec is a computer program implementing an algorithm that compresses and decompresses digital audio data according to a given audio file format or streaming media audio format. Under an embodiment, the audio codec 2924 generates sounds and processes MP3 files. The audio codec 2924 includes an integrated 1-Watt speaker amplifier.

The processor is coupled to a Bluetooth module 2932. Bluetooth is a wireless technology for exchanging data over short distances. The Bluetooth module includes integrated stack software and comprises class 1 and class 2 configurations.

The processor is coupled to a USB 2.0 connector 2918 for recharging the battery. The USB 2.0 connector also provides an interface to external devices.

The processor is coupled to an RF module 2940 The RF Module includes a TCXO 32 MHz transceiver. The transceiver integrated circuit (IC) works from an 866 to a 915 MHz band. The transceiver implements Gaussian frequency shift keying modulation. The transceiver module transmits data at a rate of 3000 bit/s. The transceiver module provides 25 kHz channel separation.

The transceiver IC 2942 is coupled to Surface Acoustic Wave (SAW) 2944, 2946 filters which filter incoming and outgoing transmissions. The SAW filters reduce spurious emissions and provide out-of-band interference rejection under one embodiment. SAW filters may be dedicated for each frequency band. A power amplifier 2948 amplifies RF signals from 10-20 MW to 0.5 W or 1 W. A Tx/Rx RF switch 2952 is integrated into the power amplifier under an embodiment. The power amplifier 2948 is coupled to a low pass filter 2954 which reduces spurious emissions of the power amplifier. The Tx/Rx switch is coupled to a low noise amplifier 2950 which amplifies received signals via the whip antenna 2956 from the GPS tracking unit.

The processor 2902 of the handheld device performs one or more of the following functions:
- produces terrain map calculations, rotations and visualizes maps via LCD display, under an embodiment;
- processes user interface via rotary encoder and switches, under an embodiment;
- receives, evaluates, measures handheld device's navigation coordinates and speed via GPS/GLONASS module, under an embodiment;
- receives GPS-collar location messages via RF-receiver and visualizes objects to the LCD display, under an embodiment;
- transmits stimulation commands to the GPS tracking unit via RF-transmitter, under an embodiment;
- transmits handheld device's geological location to other handheld units in same group via RF-transmitter, under an embodiment;
- provides power management control via power management IC, under an embodiment;
- provides battery recharge control via power management IC, under an embodiment;
- provides two way communication via Bluetooth module, under an embodiment;
- provides two way communication via USB 2.0, under an embodiment;
- generates audio signals and sounds via audio codec IC, under an embodiment;
- measures ambient light level for adjusting the LCD display back light level, under an embodiment;
- saves/reads data from the memory modules, under an embodiment; and
- saves/reads user settings to/from the memory modules 2910-2916, under an embodiment.

Figure 30:
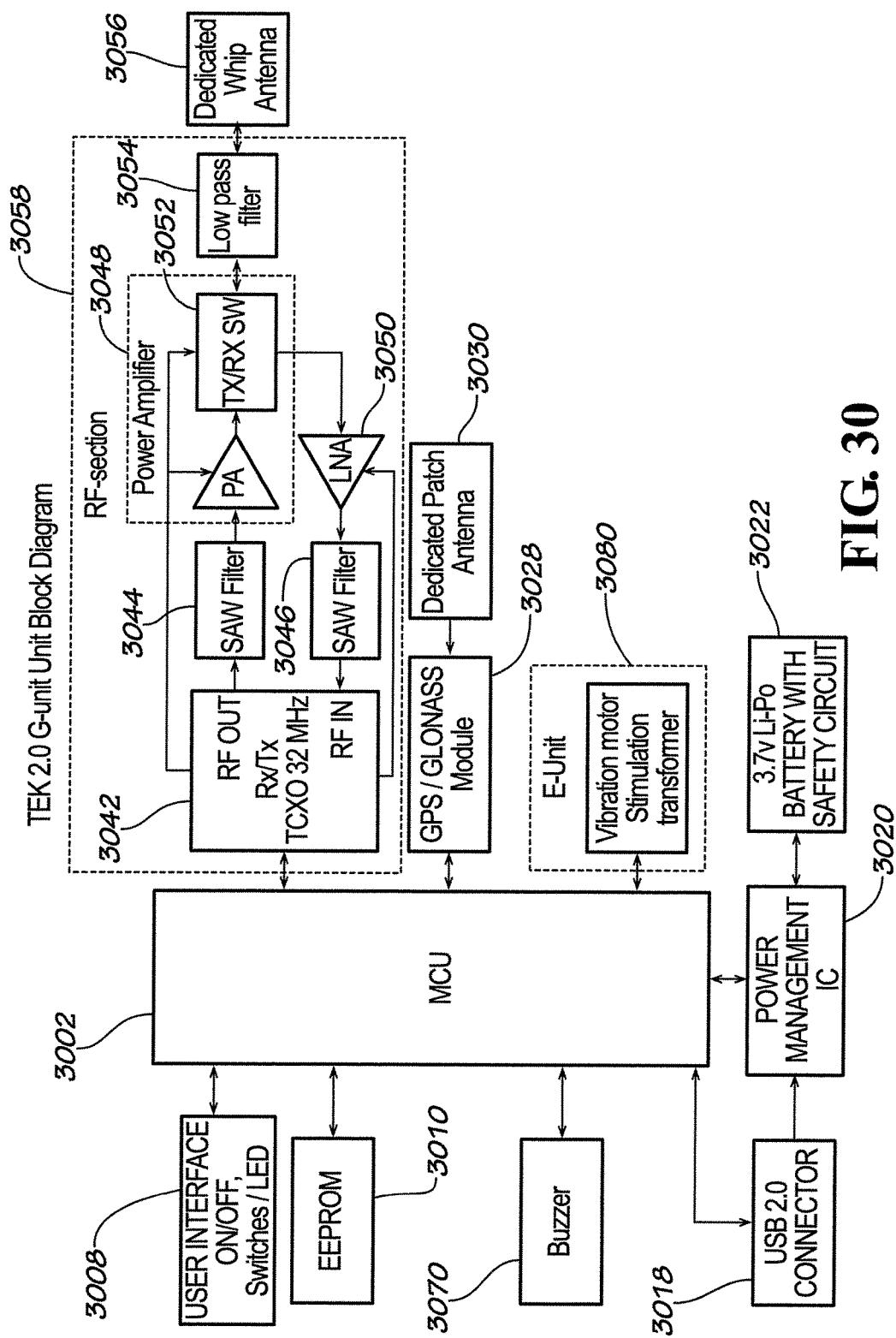
FIG. 30 is a unit block diagram describing circuitry of a tracking unit, under an embodiment.

As indicated above, the handheld control device wirelessly communicates with the GPS tracking unit (and E-collar unit through the GPS tracking unit). FIG. 30 shows a block diagram describing circuitry of the GPS tracking unit under an embodiment.

As seen in FIG. 30, the tracking unit includes a Micro Controlling Unit (MCU) 3002. The MCU 3002 is coupled to a user interface 3008. The interface 3008 includes an On/Off button for turning the device on and off. Under one embodiment, an LED light indicates On/Off status of the tracking unit.

The MCU 3002 is coupled to an EEPROM (Electronically Erasable Read-Only Memory) memory module 3010. EEPROM comprises a type of non-volatile memory used in computers and other electronic devices to store small amounts of data that must be saved when power is removed, e.g., calibration tables or device configuration. Under one embodiment, the EEPROM module 3010 stores settings and calibration data for the tracking unit.

The MCU 3002 is also coupled to a Power Management Integrated Circuit (PMIC) 3020. Under an embodiment, the PMIC 3020 may include an integrated linear recharger for the 3.7V Lithium ion battery 3022 coupled to the PMIC. The Lithium ion battery includes a safety circuit and Negative Temperature Coefficient (NTC) resistor.

The MCU 3002 is also coupled to a buzzer component 3070. The buzzer component 3070 generates sounds by using a driver circuit.

The MCU 3002 is coupled to an RF module 3058 which includes components 3042-3056. The RF module components are under one embodiment the same as (and function in a manner analogous to) the components of RF module 2940 shown in FIG. 29.

The MCU 3002 is coupled to the E-collar unit 3080. The E-collar unit applies harmless electric stimulation to the dog when commands arrive via RF receiver circuitry of the tracking unit and are subsequently communicated to E-collar unit. The E-collar unit applies harmless vibration to the dog when commands arrive via RF receiver circuitry of the tracking unit and are subsequently communicated to E-collar unit.

The MCU 3002 performs one or more of the following functions:
- measures tracking unit's navigation coordinates and speed via GPS/GLONASS module, under an embodiment;
- receives stimulation commands from the handheld device via RF-transmitter, under an embodiment;
- transmits tracking unit's own geological location to the hand held devices/units in same group via RF-transmitter, under an embodiment;
- implements battery recharge control via power management IC, under an embodiment;
- provides two way communication with external devices via USB 2.0, under an embodiment;
- generates audio signals and sounds via buzzer, under an embodiment; and
- saves/reads data from the memory 3010, under an embodiment.

Under an embodiment, the transceiver of the tracking unit's RF module transmits signals including positioning date to the remote handheld control device at defined intervals ranging from 2.5 seconds to 2 minutes; otherwise the transceiver listens for command signals transmitted by the remote device. A command signal may comprise an instruction to apply stimulus to an animal wearing the integrated GPS tracking/E-collar system.

The tracking unit may also include a 3D accelerometer and magnetometer component that functions to identify and report a stance or posture of an animal wearing the integrated system. For example, a dog on point assumes a different posture than a dog treeing an animal. The 3D accelerometer and magnetometer detect the posture and report the activity to the remote handheld control unit.

The tracking unit may also include a bark detection circuitry. The bark detection circuitry detects and reports barks per minute to a remote handheld controller. The bark per minute metric may be unique to certain animal behaviors. For example, the bark per minute is different for a dog that is tracking versus baying an animal. The microcontroller reports the bark per minute metric to the remote handheld transceiver. Accordingly, a user of the integrated GPS tracking/E-collar unit system may use the bark per minute metric to detect an activity of the animal when the animal is neither within visible or audible range of the user. For example, the bark per minute metric may indicate the vocalizing of a dog at bay.

Figure 31:
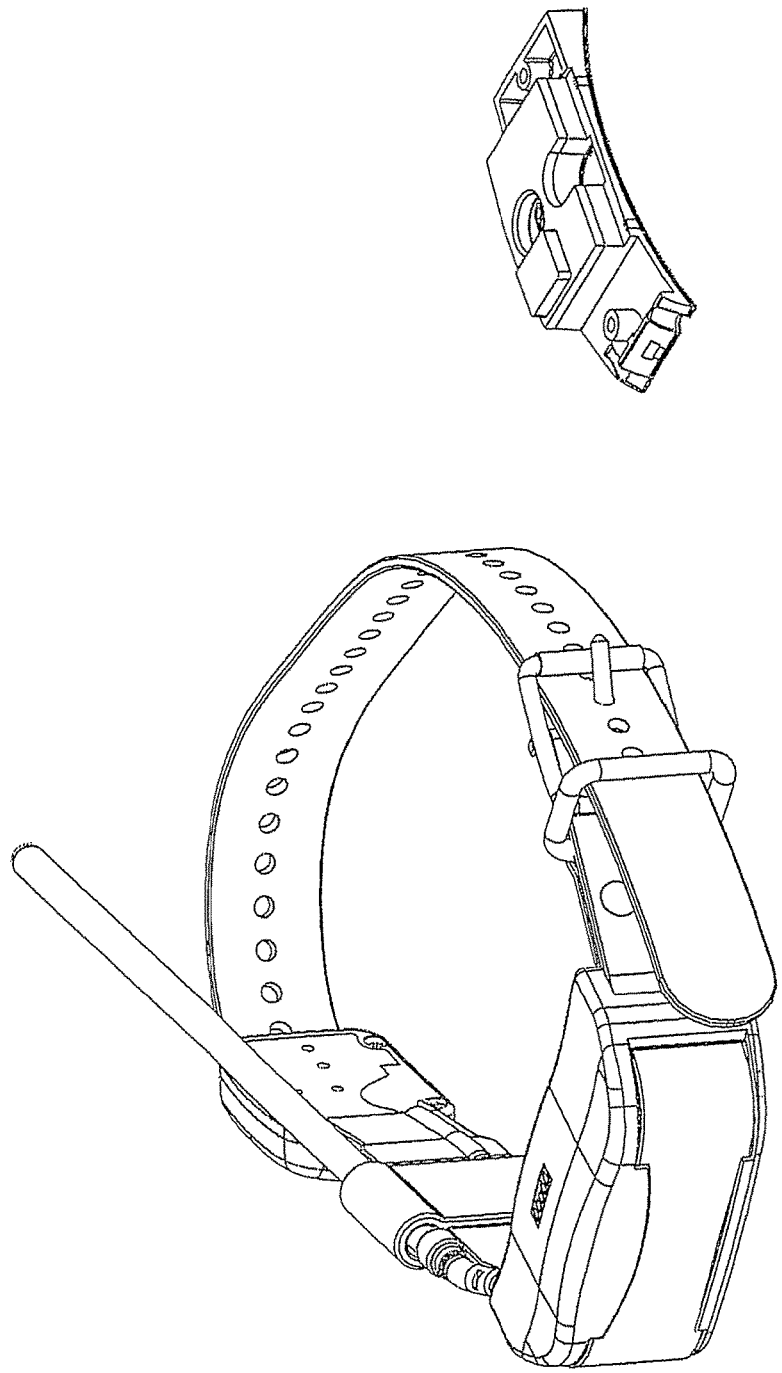
FIG. 31 shows the integrated GPS tracking/E-collar system, under an embodiment.
Figure 32:
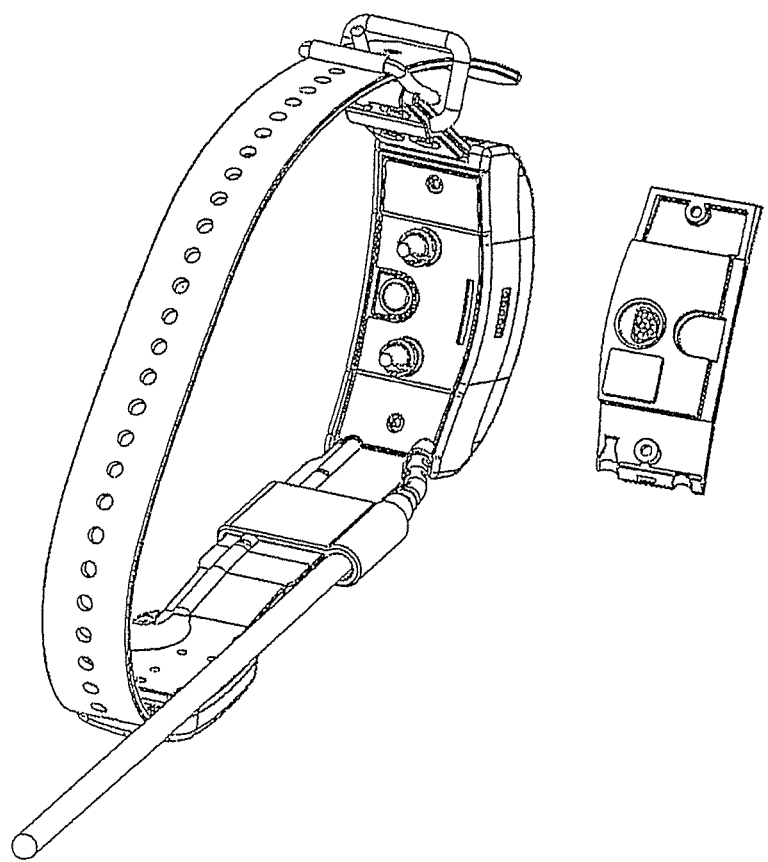
FIG. 32 shows the integrated GPS tracking/E-collar system, under an embodiment.
Figure 33:
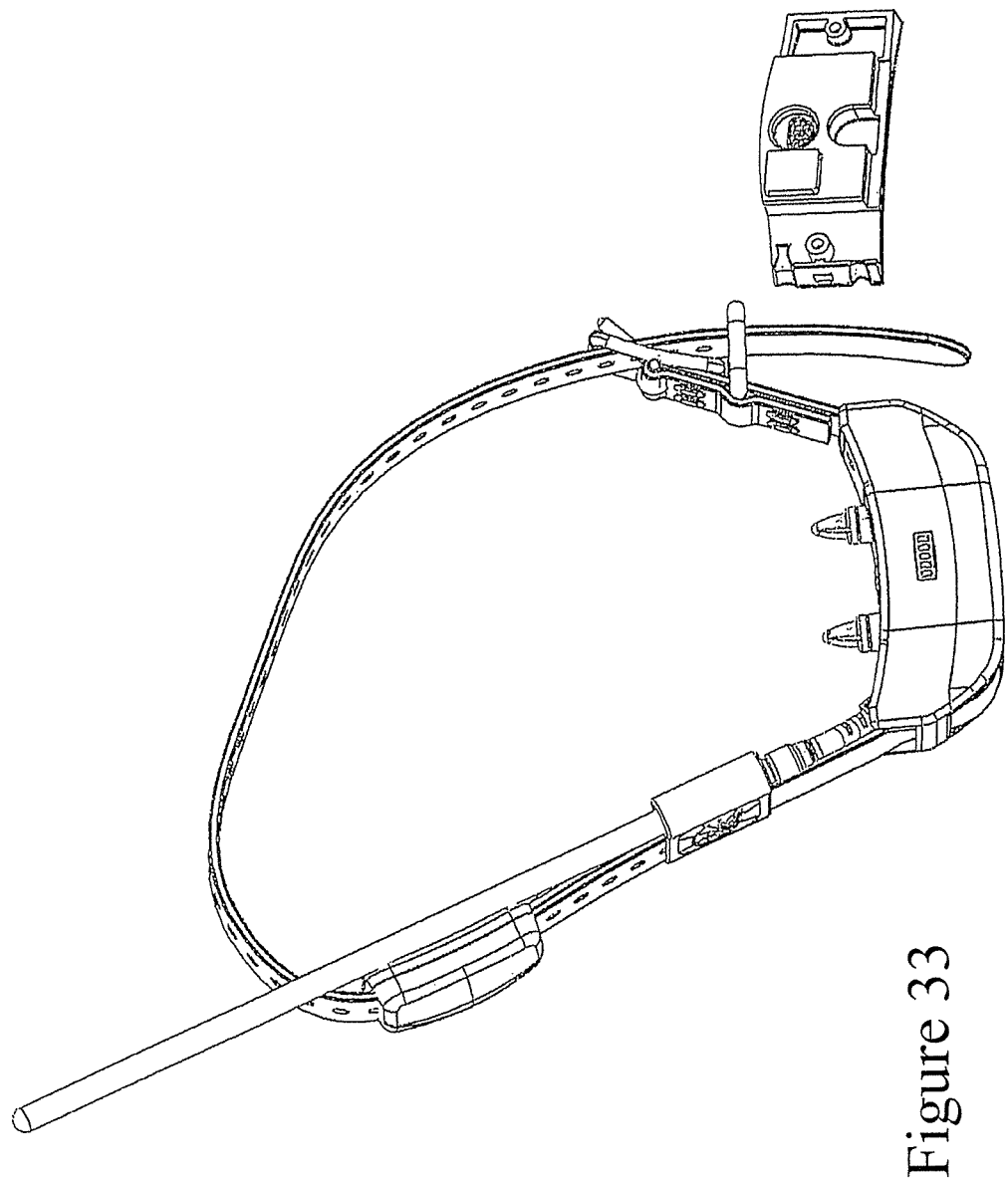
FIG. 33 shows the integrated GPS tracking/E-collar system, under an embodiment.

FIGS. 31-33 show the integrated GPS tracking/E-collar system under an embodiment. Note that FIGS. 31-33 show the integrated system attached to a collar which may then be used to mount the system onto an animal. Further, such figures show an example of a decoupled E-collar unit next to each integrated GPS tracking/E-collar system.

According to various embodiments of the present general inventive concept, an animal tracking and control system and apparatus (also referred to as a GPS tracking/E-collar system and apparatus under an alternative embodiment) provides a user with an animal tracking, animal training, or animal tracking/training system that can be user configured. In any of a number of example configurations, there is only one collar (or other animal encircling device) mounted device which is provided to the animal, and only one control device to control the mounted device. The control device may be a remote handheld control unit. Such an apparatus and system greatly simplifies the mounting and operation of an animal training and/or tracking system. Such an apparatus and system also benefits the animal provided with the tracking and control apparatus, due to reduced bulk and weight resulting from not having to wear two separate devices with two separate securing members.

The concepts and techniques disclosed herein are not limited to the tracking and control of animals, and could be applied to various other applications and objects, without departing from the scope and spirit of the present general inventive concept. For example, although the description discusses a dog collar worn by a dog, the present general inventive concept is not limited to any particular type of animal, and further may be used by a human or mechanical mobile subject.

While the present general inventive concept has been illustrated by description of several example embodiments, it is not the intention of the applicant to restrict or in any way limit the scope of the inventive concept to such descriptions and illustrations. Instead, the descriptions, drawings, and claims herein are to be regarded as illustrative in nature, and not as restrictive, and additional embodiments will readily appear to those skilled in the art upon reading the above description and drawings.

Each patent, patent application, and/or publication mentioned in this specification is herein incorporated by reference in its entirety to the same extent as if each individual patent, patent application, and/or publication was specifically and individually indicated to be incorporated by reference.

U.S. patent application Ser. No. 13/311,129, filed on Dec. 5, 2011 is incorporated herein in its entirety by reference.

We claim:

1. An animal tracking and control apparatus, comprising:
a tracking unit configured and programmed to track the location of an animal, wherein the tracking unit comprise a housing;
a stimulus unit to provide a stimulus to the animal; and
a support device for supporting the tracking unit on the animal;
wherein:
the tracking unit and the stimulus unit are configured to be removably coupled, wherein the removable coupling comprises the stimulus unit removably attached to the housing, wherein the removable coupling comprises a sealed electrical contact between the housing and the stimulus unit, wherein the removable coupling comprises a sealed electrical pathway between the tracking unit and the stimulus unit;
the tracking unit detects the presence of the stimulus unit when the stimulus unit is removably attached to the housing; and
the tracking unit is configured to wirelessly communicate with a control device remote from the tracking unit.

2. The apparatus of claim 1, wherein the tracking unit automatically detects the presence of the stimulus unit when the stimulus unit is removably attached to the housing.

3. The apparatus of claim 1, wherein the tracking unit is fixed to an animal encircling device.

4. The apparatus of claim 1, wherein the coupling between the housing and the stimulus unit comprises a water tight seal.

5. The apparatus of claim 1, wherein the tracking unit includes a Global Navigation Satellite Systems (GNSS) device that provides location information of the tracking unit to the control device.

6. The apparatus of claim 1, wherein the tracking unit includes bark detection circuitry that detects barks per minute of the animal.

7. The apparatus of claim 6, wherein the tracking unit transmits the barks per minute to the control device.

8. The apparatus of claim 1, wherein the tracking unit includes a three dimensional accelerometer and magnetometer component to detect posture information of the animal.

9. The apparatus of claim 8, wherein the tracking unit transmits the posture information to the control device.

10. The apparatus of claim 1, wherein the stimulus unit is provided with one or more probes to contact a skin surface of the animal and to deliver one or more electrical corrective pulses in response to input from the control device, wherein the stimulus comprises the one or more electrical corrective pulses.

11. The apparatus of claim 10, wherein the stimulus unit is a slave device to the tracking unit.

12. The apparatus of claim 10, wherein the stimulus unit does not have its own control circuitry, but is configured to receive signals from the control device through the tracking unit.

13. The apparatus of claim 12, wherein the received signals include command signals to initiate the one or more corrective pulses.

14. The apparatus of claim 10, wherein the stimulus unit does not have its own power source, but is configured to receive operating power from a power source located within the tracking unit.

15. The apparatus of claim 10, wherein the stimulus unit does not have its own antenna, but communicates wirelessly with the control device through an antenna associated with the tracking unit.

16. The apparatus of claim 1, wherein the detecting the presence of the stimulus unit includes communicating with the stimulus unit.

17. An animal tracking and control apparatus, comprising:
a tracking unit configured and programmed to track the location of an animal, wherein the tracking unit comprises a housing;
a stimulus unit to provide a stimulus to the animal; and
a support device for supporting the tracking unit on the animal;
wherein:
the tracking unit and the stimulus unit are configured to be removably coupled, wherein the removable coupling comprises the stimulus unit removably attached to the housing, wherein the removable coupling comprises a sealed electrical contact between the housing and the stimulus unit;
the tracking unit communicates with the stimulus unit when the stimulus unit is removably attached to the housing; and
the tracking unit is configured to wirelessly communicate with a control device remote from the tracking unit.

18. An animal tracking and control apparatus, comprising:
a tracking unit configured and programmed to track the location of an animal, wherein the tracking unit comprises a housing;
a stimulus unit to provide a stimulus to the animal, wherein the stimulus unit is configured to receive operating power from a power source located within the housing; and
a support device for supporting the tracking unit on the animal;
wherein:
the tracking unit and the stimulus unit are configured to be removably coupled, wherein the removable coupling comprises the stimulus unit removably attached to the housing, wherein the removable coupling comprises a sealed electrical contact between the housing and the stimulus unit;
the tracking unit communicates with the stimulus unit when the stimulus unit is removably attached to the housing; and
the tracking unit is configured to wirelessly communicate with a control device remote from the tracking unit, wherein the stimulus unit is configured to receive signals from the control device through the tracking unit, wherein the received signals include command signals to initiate the stimulus to the animal.

\* \* \* \* \*